(12) United States Patent
Ishihara

(10) Patent No.: US 11,443,719 B2
(45) Date of Patent: Sep. 13, 2022

(54) INFORMATION PROCESSING APPARATUS AND INFORMATION PROCESSING METHOD

(71) Applicant: SONY CORPORATION, Tokyo (JP)

(72) Inventor: Atsushi Ishihara, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/982,886

(22) PCT Filed: Jan. 29, 2019

(86) PCT No.: PCT/JP2019/002841
§ 371 (c)(1),
(2) Date: Sep. 21, 2020

(87) PCT Pub. No.: WO2019/187592
PCT Pub. Date: Oct. 3, 2019

(65) Prior Publication Data
US 2021/0005167 A1    Jan. 7, 2021

(30) Foreign Application Priority Data

Mar. 29, 2018    (JP) .............................. JP2018-063634

(51) Int. Cl.
*G09G 5/38* (2006.01)
*G06F 3/01* (2006.01)

(52) U.S. Cl.
CPC .............. *G09G 5/38* (2013.01); *G06F 3/011* (2013.01); *G09G 2340/0435* (2013.01); *G09G 2354/00* (2013.01)

(58) Field of Classification Search
CPC ............. G09G 5/38; G09G 2340/0435; G09G 2354/00; G06F 3/011; G06F 3/0346; G06F 3/013; G06F 3/0487; G06T 15/10
See application file for complete search history.

(56) References Cited

U.S. PATENT DOCUMENTS

2013/0335442 A1* 12/2013 Fleck ..................... G09G 3/003
345/629
2014/0359656 A1* 12/2014 Banica ................. H04N 21/234
725/32

(Continued)

FOREIGN PATENT DOCUMENTS

AU    2016378555 A1    3/2018
CA    2998904 A1    6/2017

(Continued)

OTHER PUBLICATIONS

International Search Report and Written Opinion of PCT Application No. PCT/JP2019/002841, dated Apr. 9, 2019, 11 pages of ISRWO.

(Continued)

*Primary Examiner* — Yi Wang
(74) *Attorney, Agent, or Firm* — Chip Law Group

(57) ABSTRACT

Provided is an information processing apparatus including a rendering control unit that switches a rendering frequency of a virtual image between a first rendering frequency and a second rendering frequency higher than the first rendering frequency on the basis of a sensing result relating to a real space, and a display control unit that causes a display device to display the virtual image on the basis of the sensing result and either the first rendering frequency or the second rendering frequency.

19 Claims, 16 Drawing Sheets

(56) References Cited

U.S. PATENT DOCUMENTS

| | | |
|---|---|---|
| 2015/0379772 A1 | 12/2015 | Hoffman |
| 2017/0178408 A1 | 6/2017 | Bavor et al. |
| 2017/0213388 A1 | 7/2017 | Margolis et al. |
| 2019/0206139 A1 | 7/2019 | Bavor et al. |
| 2019/0287495 A1* | 9/2019 | Mathur .................. G06F 3/147 |

FOREIGN PATENT DOCUMENTS

| | | |
|---|---|---|
| CN | 108140262 A | 6/2018 |
| CN | 108431739 A | 8/2018 |
| EP | 3394835 A2 | 10/2018 |
| JP | 2002-189464 A | 7/2002 |
| JP | 2010-050645 A | 3/2010 |
| JP | 2013-214162 A | 10/2013 |
| JP | 5825179 B2 | 12/2015 |
| JP | 2019-507509 A | 3/2019 |
| JP | 6732893 B2 | 7/2020 |
| JP | 2020-174384 A | 10/2020 |
| KR | 10-2016-0002602 A | 1/2016 |
| KR | 10-2018-0039723 A | 4/2018 |
| KR | 10-2020-0027060 A | 3/2020 |
| WO | 2017/112692 A2 | 6/2017 |
| WO | 2017/131977 A1 | 8/2017 |

OTHER PUBLICATIONS

Extended European Search Report of EP Application No. 19776689.2, dated Apr. 23, 2021, 09 pages.

* cited by examiner

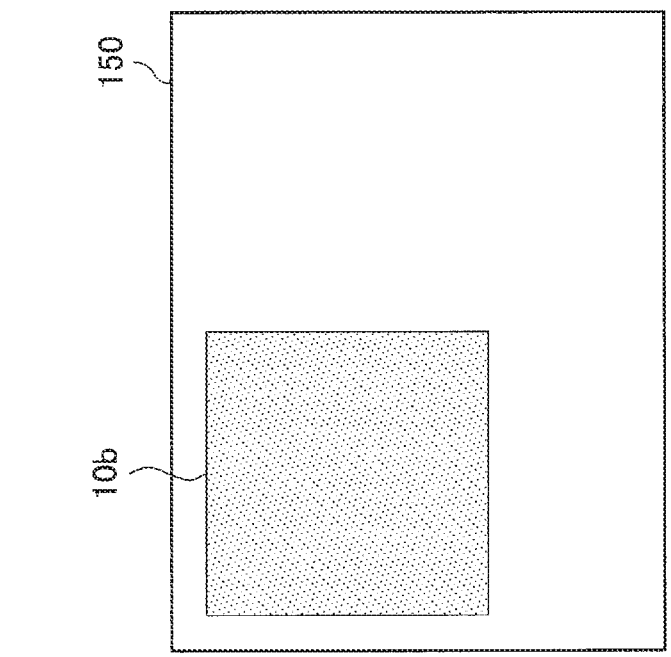
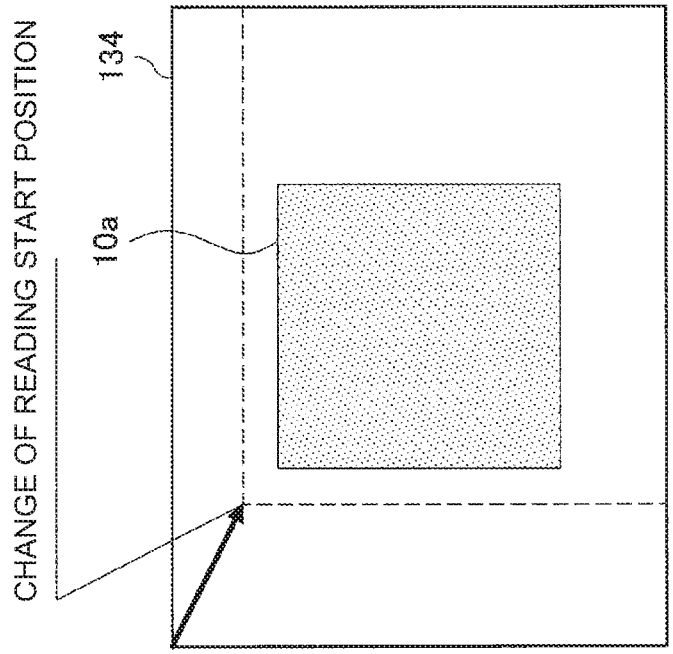
FIG.2

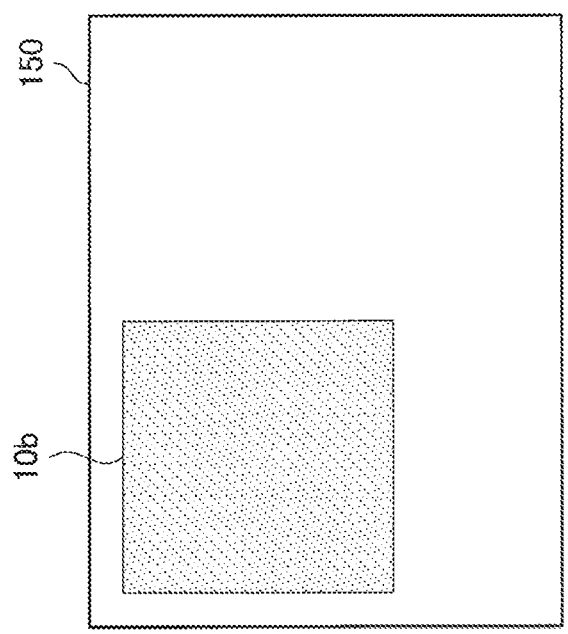
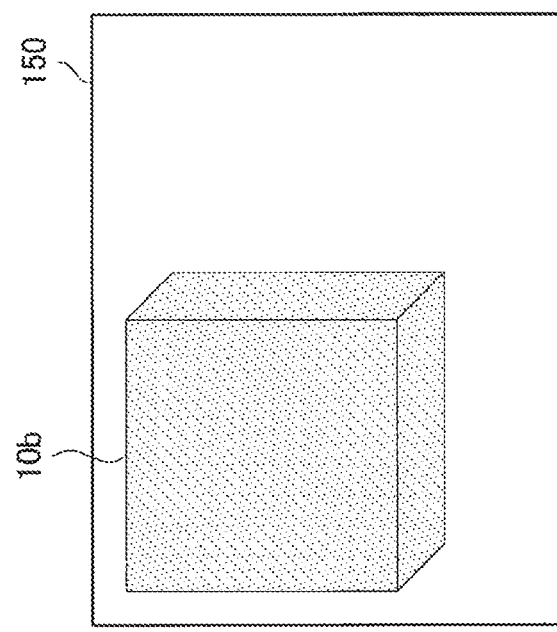
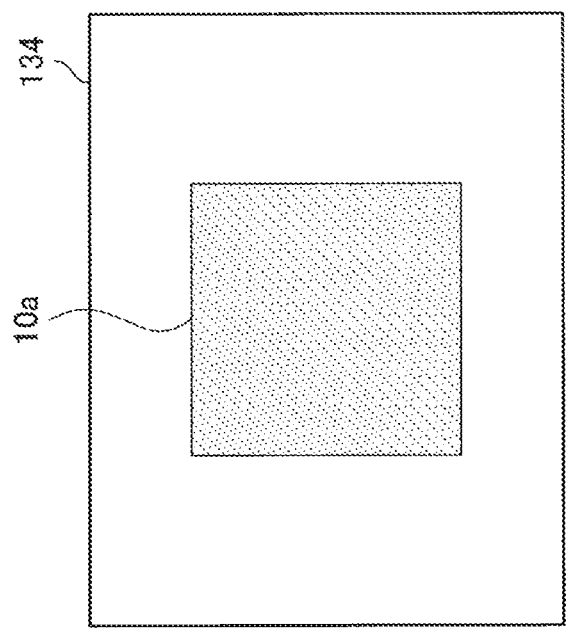
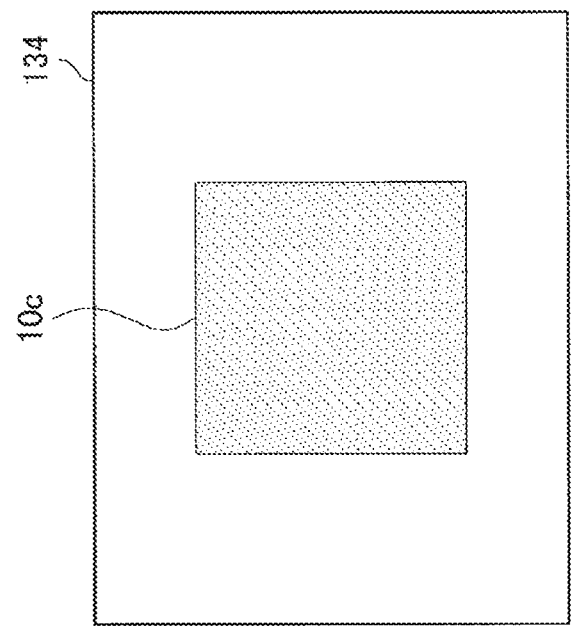
FIG. 3A
FIG. 3B

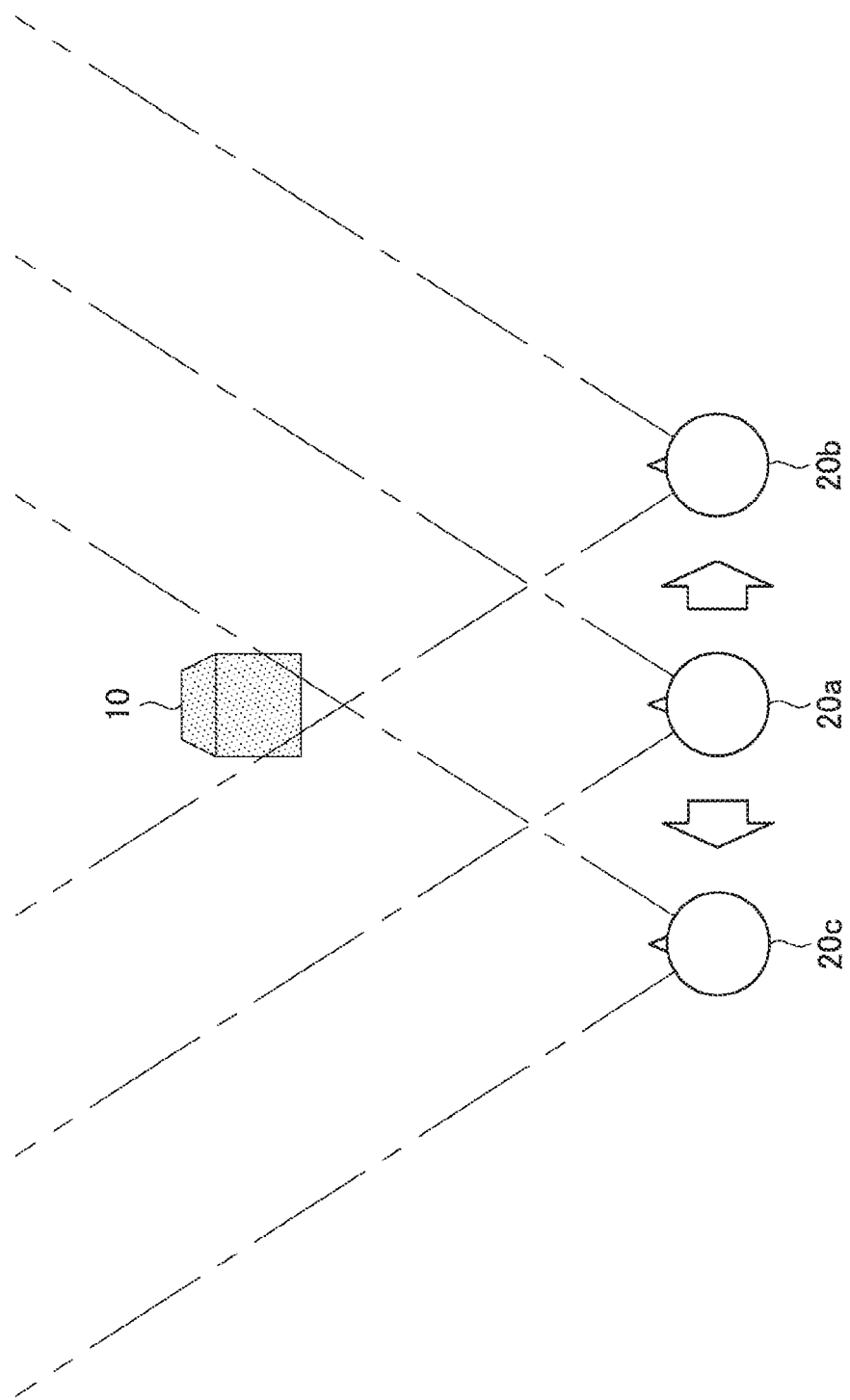

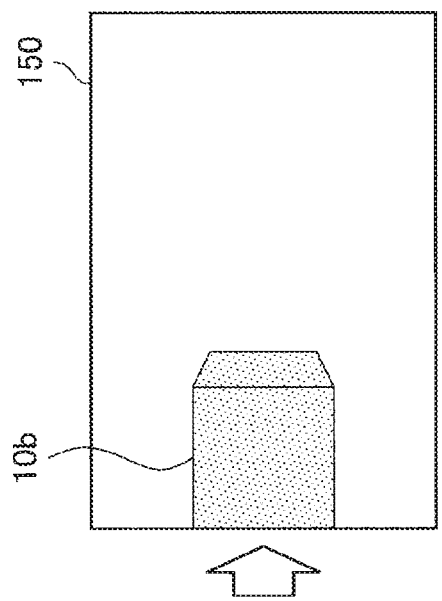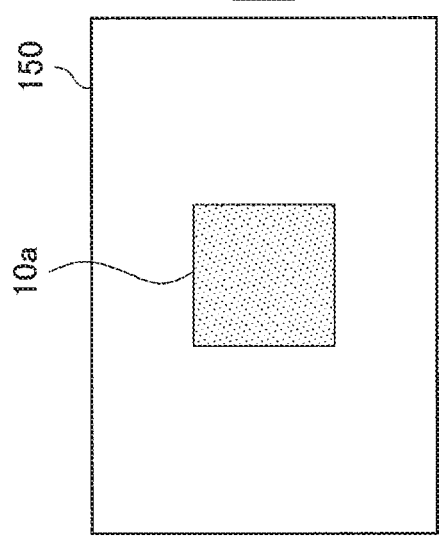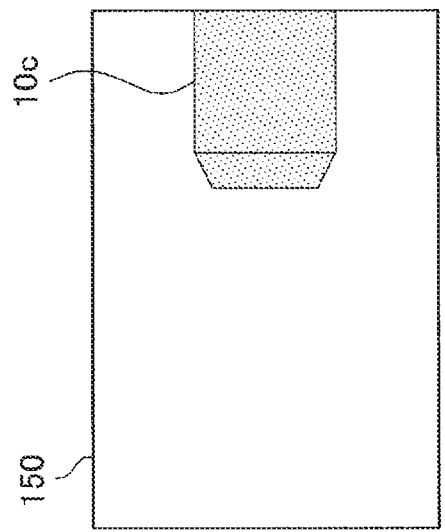

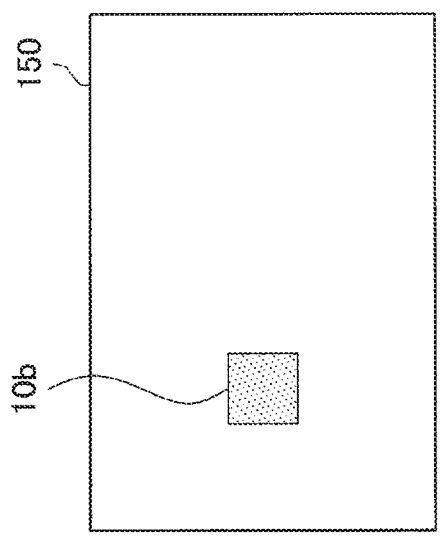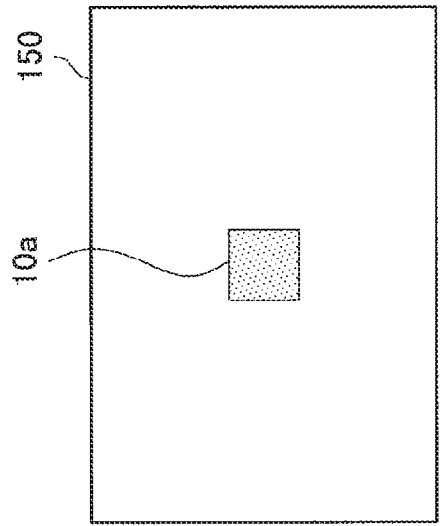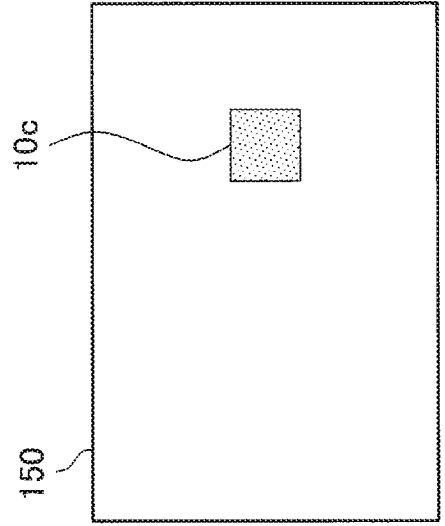

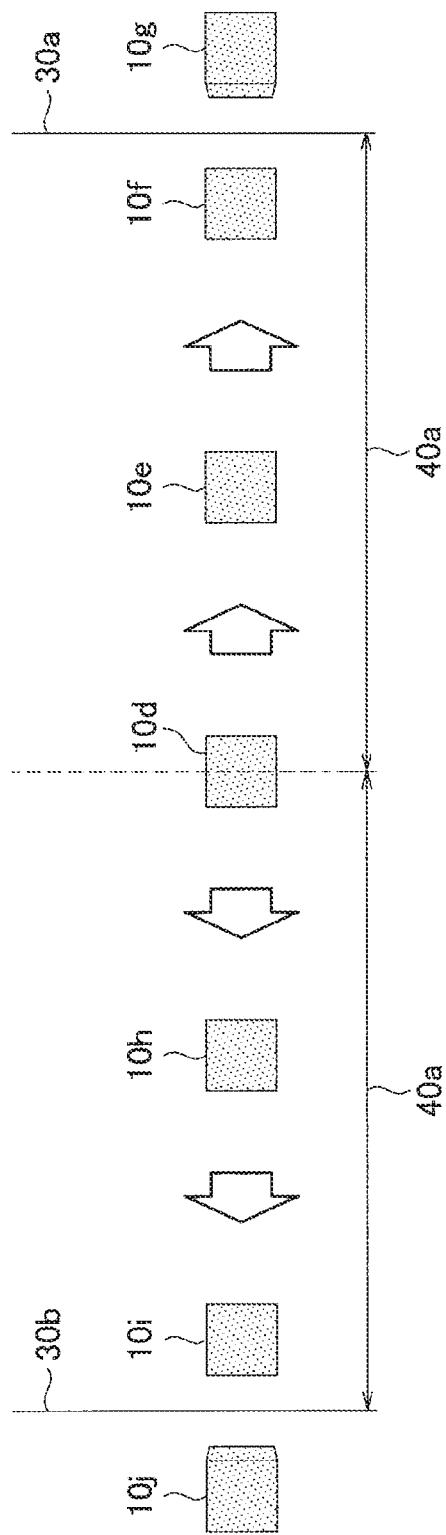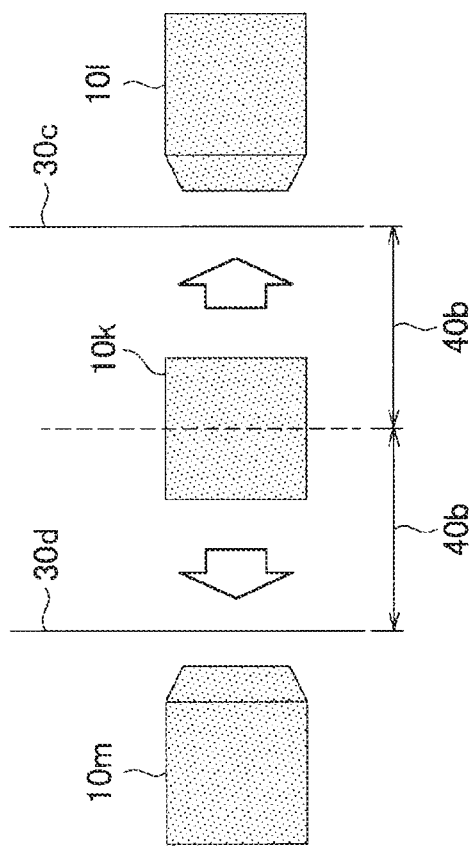

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2019/002841 filed on Jan. 29, 2019, which claims priority benefit of Japanese Patent Application No. JP 2018-063634 filed in the Japan Patent Office on Mar. 29, 2018. Each of the above-referenced applications is hereby incorporated herein by reference in its entirety.

FIELD

The present disclosure relates to an information processing apparatus, an information processing method, and a program.

BACKGROUND

In recent years, with the advancement of information processing technologies, technologies that display virtual images, such as virtual reality (VR) and augmented reality (AR), have been used in various apparatuses, systems, and services.

For example, Patent Literature 1 discloses a technology that enables a distant limit of a rendering range to be set to the farthest possible limit by changing the frequency of updating scenery with a virtual image attached according to, for example, the distance between a user and the virtual image or a moving speed of the user in a virtual space.

CITATION LIST

Patent Literature

Patent Literature 1: JP 2013-214162 A

SUMMARY

Technical Problem

In prior art including Patent Literature 1, the rendering of a virtual image based on a sensing result relating to a real space is not sufficiently taken into consideration. Thus, there is room for improvement in the quality of the rendering or display of a virtual image.

The present disclosure has been made in view of the above, and provides a new and improved information processing apparatus, a new and improved information processing method, and a new and improved program that enable improvement in the quality of rendering or display of a virtual image based on a sensing result relating to a real space.

Solution to Problem

According to the present disclosure, an information processing apparatus is provided that includes: a rendering control unit and a display control unit. The rendering control unit switches a rendering frequency of a virtual image between a first rendering frequency and a second rendering frequency higher than the first rendering frequency on the basis of a sensing result relating to a real space. The display control unit causes a display device to display the virtual image on the basis of the sensing result and either the first rendering frequency or the second rendering frequency.

Moreover, according to the present disclosure, an information processing method executed by at least one processor is provided that includes: switching a rendering frequency of a virtual image between a first rendering frequency and a second rendering frequency higher than the first rendering frequency on the basis of a sensing result relating to a real space; and causing a display device to display the virtual image on the basis of the sensing result and either the first rendering frequency or the second rendering frequency.

Moreover, according to the present disclosure, a program is provided that causes a computer to execute: switching a rendering frequency of a virtual image between a first rendering frequency and a second rendering frequency higher than the first rendering frequency on the basis of a sensing result relating to a real space; and causing a display device to display the virtual image on the basis of the sensing result and either the first rendering frequency or the second rendering frequency.

Advantageous Effects of Invention

As described above, the present disclosure enables improvement in the quality of rendering or display of a virtual image based on a sensing result relating to a real space.

Note that the effects of the present disclosure are not necessarily limited to the above effect. The present disclosure may achieve, in addition to or instead of the above effect, any effect described in the specification or another effect that can be grasped from the specification.

BRIEF DESCRIPTION OF DRAWINGS

FIG. 2 is a diagram describing 2D correction. FIGS. 3A and 3B are diagrams describing the difference between the 2D correction and 3D rendering.

FIG. 4 is a diagram describing parallax in a case where the distance between a user and a virtual image is small.

FIGS. 5A, 5B, and 5C are diagrams describing the parallax in the case where the distance between the user and the virtual image is small.

FIGS. 7A, 7B, and 7C are diagrams describing the parallax in the case where the distance between the user and the virtual image is large.

FIGS. 8A and 8B are diagrams illustrating a 2D correction threshold according to the distance between the user and the virtual image.

DESCRIPTION OF EMBODIMENTS

Figure 1:
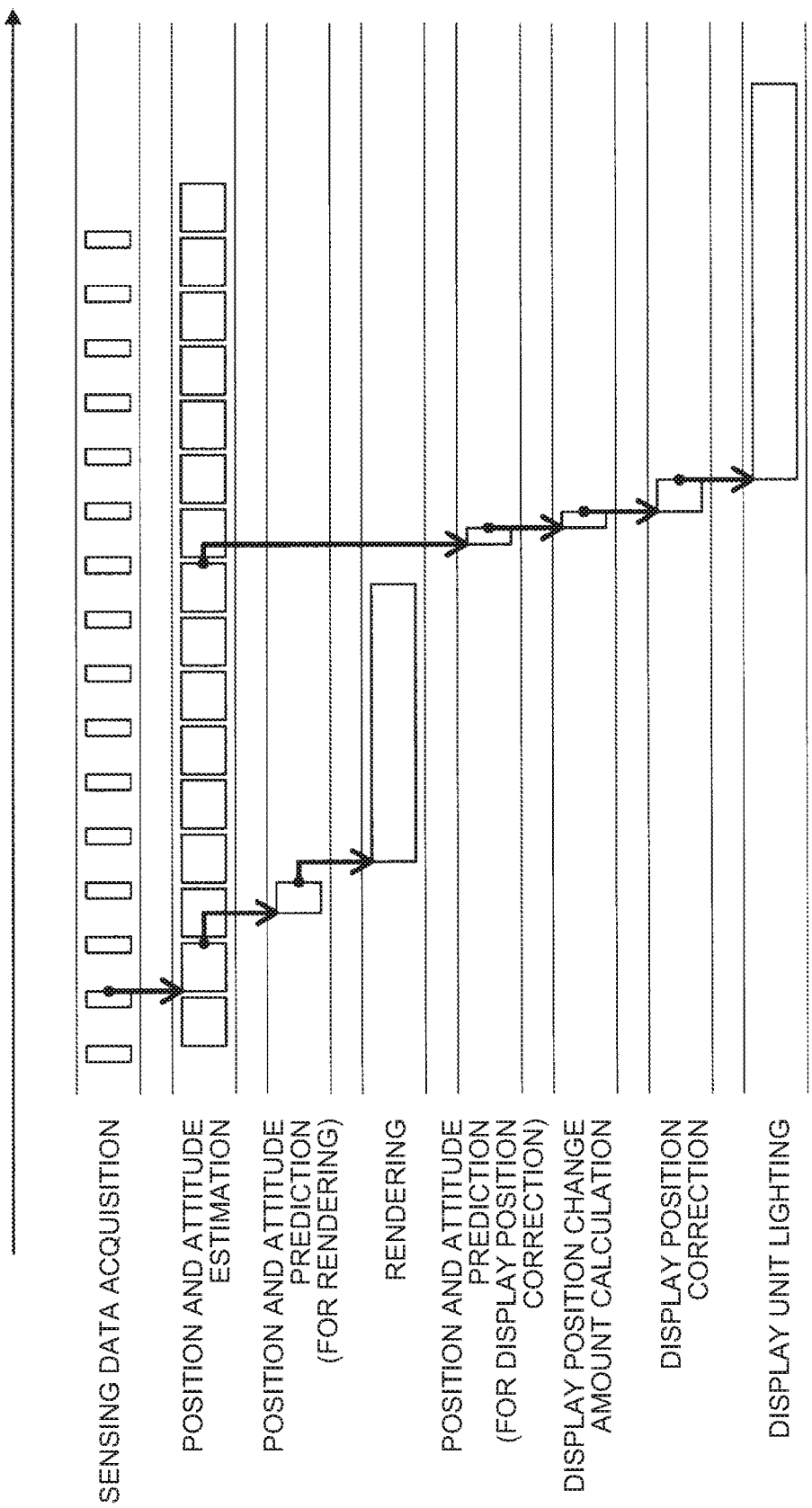
FIG. 1 is a diagram describing an outline of the operation of an HMD displaying a virtual image.

Hereinbelow, preferred embodiments of the present disclosure will be described in detail with reference to the accompanying drawings. Note that, in the specification and drawings, elements having substantially the same functional configuration are designated by the same reference sign to omit redundant description.

Note that the description will be made in the following order.
1. Background
2. Outline
3. First Embodiment
   3-1. Functional Configuration
   3-2. Operation
   3-3. Application Example
4. Second Embodiment
   4-1. Functional Configuration
   4-2. Operation
   4-3. Application Example
5. Hardware Configuration
6. Conclusion

1. Background

First, the background of the present disclosure will be described.

As described above, in recent years, with the advancement of information processing technologies, technologies that enable various user experiences by displaying virtual images, such as AR and VR, have been developed actively. Typically, VR can be regarded as a technology that displays an image in a space (virtual space) representing a location different from a location of a user in a real space while changing the image according to changes in the position and attitude of a display device. In this case, the image in the virtual space can include an image in a real space at a distant location. On the other hand, AR can be regarded as a technology that adds additional information such as a virtual image to an image in a real space representing a location substantially the same as a location of a user present in the real space. In this case, the image in the real space includes not only an image in the real space directly visually recognized optically by the user, but also an image in the real space acquired by an imaging device in real time.

For example, there has been developed a technology that changes a virtual image to be displayed on a head-mounted display (hereinbelow, referred to as "HMD") in conjunction with the position and attitude or movement of a user wearing the HMD. More specifically, the HMD performs a process for estimating the position and attitude of the HMD using a sensor (e.g., an outward stereo camera, an acceleration sensor, or a gyro sensor) mounted on the HMD and predicting the position and attitude of the HMD after an elapse of a certain time. Further, the HMD renders a virtual image according to a result of the process and displays the virtual image on a display. For example, the HMD renders the virtual image at a certain frame rate (e.g., 60 [Hz]) in conjunction with the movement of a user so that the virtual image can be displayed following changes in the user's view.

At this time, the virtual image displayed on the HMD may flicker. The flicker is caused by various factors. For example, rendering the virtual image on the basis of a sensing result relating to a real space as describe below may cause the flicker.

For example, the flicker of the virtual image may be caused by a slight change in the position and attitude of the HMD. More specifically, when the position and attitude of the HMD slightly changes, the HMD renders a virtual image with a slight change at high speed (at the frame rate frequency) reflecting the change in the position and attitude of the HMD, which many result in flicker of the virtual image. Further, the HMD may render a virtual image with lighting (indicating processing for showing the image as if light is applied to the image from a virtual light source disposed in a three-dimensional space) applied. In this case, even when a change in the position and attitude of the HMD is slight, a change in the virtual image caused by the change becomes larger. Thus, the flicker of the virtual image becomes larger. Further, the slight change in the position and attitude of the HMD causes a larger change in a three-dimensional virtual image than in a two-dimensional virtual image. Thus, the flicker of the virtual image becomes larger in the three-dimensional virtual image even when no lighting is applied.

Note that various factors cause the slight change in the position and attitude of the HMD. For example, in estimation or prediction of the position and attitude by the HMD using a result of imaging by the outward stereo camera which is mounted on the HMD, the accuracy of a result of the estimation or prediction of the position and attitude by the HMD is reduced when the imaging environment is dark or when there are many flat areas with small change in the captured image. Thus, even when the position and attitude of the HMD hardly changes actually, the estimation result or the like of the position and attitude may slightly change.

Further, when the HMD corrects the position and attitude of the HMD using output of various sensors (e.g., the gyro sensor and the acceleration sensor) mounted on the HMD, accumulation of calculation errors of the sensors with an elapse of time may increase an error in the estimation result or the like of the position and attitude. Further, an output error of the various sensors may increase as the temperature of the sensors themselves and the peripheral temperature become higher, which may increase the error in the estimation result or the like of the position and attitude. Further, the various sensors operate independently from each other. Thus, the error of the estimation result or the like of the position and attitude may further increase by the above errors of the various sensors acting on each other.

Further, for example, when the virtual image is standing still (or when the virtual image is moving at low speed), when the virtual image has a complicated shape, pattern, or color, or when the distance between the user and the virtual image is small, the flicker of the virtual image becomes larger. For example, when the user observes a virtual image of an art object with complicated processing applied near the virtual image, the user more sensitively feels flicker of the virtual image.

Note that, in addition to the slight change in the position and attitude of the HMD, the flicker of the virtual image becomes larger (or the user is more likely to recognize the flicker), for example, when the resolution of the display is low. In particular, a wearable device, such as an HMD, may have a reduced resolution of the display in order to reduce power consumption or heat generation. In this case, the user may recognize flicker of the virtual image.

The inventor of the present disclosure has created the technology according to the present disclosure in view of the above circumstances. Hereinbelow, an embodiment of the present disclosure will be described in detail.

2. Outline

The background of the present disclosure has been described above. Next, the outline of the present disclosure will be described.

The present disclosure is applicable to various apparatuses or systems. Further, the present disclosure may be applied to any apparatus or system capable of displaying some image. For example, the present disclosure may be applied to an apparatus or system capable of implementing AR or VR. Hereinbelow, as an example, a case where the present disclosure is applied to an optical transmission type HMD (hereinbelow, referred to as "HMD 100") which is an information processing apparatus configured to display an AR image will be described.

Here, the HMD 100 to be used may be of any type and any shape. For example, the HMD 100 may be of a head band type (a type attached to the head with a band worn around the entire circumference of the head or a band worn around not only the side of the head, but also the crown of the head) or a helmet type (a visor part of the helmet corresponds to a display).

The HMD 100 is provided with various sensors including an outward stereo camera which captures an image in the direction of the line of sight of the user, or the outward direction when the HMD 100 is worn, an inward stereo camera which captures an image of the eyes of the user when the HMD 100 is worn, an acceleration sensor, and a gyro sensor. Note that the sensors mounted on the HMD 100 are not limited to these sensors.

Hereinbelow, an outline of a series of operations of the HMD 100 displaying a virtual image will be described with reference to FIG. 1. First, in "SENSING DATA ACQUISITION" in FIG. 1, the HMD 100 acquires sensing data output by the various sensors including the outward stereo camera. In "POSITION AND ATTITUDE ESTIMATION", the HMD 100 estimates the position and attitude of the HMD 100 on the basis of the sensing data. In "POSITION AND ATTITUDE PREDICTION (FOR RENDERING)", the HMD 100 predicts the position and attitude of the HMD 100 when a virtual image is displayed on a display unit 150 (e.g., a display) on the basis of the estimated position and attitude of the HMD 100. Note that the HMD 100 may predict not only the position and attitude of the HMD 100, but also, for example, the position and attitude of an object in a real space visually recognized by the user by analyzing an image captured by the outward stereo camera.

In "RENDERING", the HMD 100 renders a virtual image on a frame buffer 134 on the basis of the prediction of the position and attitude. In "POSITION AND ATTITUDE PREDICTION (FOR DISPLAY POSITION CORRECTION)", the HMD 100 predicts the position and attitude of the HMD 100 at a time point when the virtual image is displayed on the display unit 150. The prediction is performed at a time point closest possible to the time point when the display on the display unit 150 is performed. In "DISPLAY POSITION CHANGE AMOUNT CALCULATION", the HMD 100 calculates a change amount of the display position of the virtual image on the basis of the prediction result of the position and attitude. In "DISPLAY POSITION CORRECTION", the HMD 100 corrects the display position of the virtual image on the basis of the change amount of the display position. In "DISPLAY UNIT LIGHTING", the HMD 100 displays the virtual image with the corrected display position on the display unit 150. Note that the processing details illustrated in FIG. 1 are merely an example, and can be appropriately modified. For example, not only the correction of the display position of the virtual image, but also correction for deforming the virtual image may be performed.

Hereinbelow, "DISPLAY POSITION CORRECTION" will be described in more detailed with reference to FIG. 2. When a virtual image 10*a* is rendered on the frame buffer 134, and the HMD 100 corrects the display position of the virtual image 10*a* to the upper left of the display unit 150 on the basis of the prediction result of the position and attitude of the HMD 100, the HMD 100 changes a reading start position to the lower right of the frame buffer 134 as illustrated in FIG. 2. This enables the HMD 100 to correct the display position of a virtual image 10*b* displayed on the display unit 150 to the upper left of the display unit 150. Hereinbelow, such two-dimensional correction of the virtual image is referred to as "2D correction".

In this manner, the HMD 100 predicts the position and attitude of the HMD 100 at the time point of the display on the display unit 150 at the time point closest possible to the time point when the display is performed and performs the 2D correction on the basis of the prediction result. Accordingly, a display delay of the virtual image felt by the user can be reduced.

Further, the 2D correction can reduce flicker of the virtual image compared to re-rendering (hereinbelow, referred to as "3D rendering") of the three-dimensional virtual image. Hereinbelow, the difference between the 2D correction and the 3D rendering will be described with reference to FIGS. 3A and 3B. FIG. 3A illustrates the 2D correction of the virtual image which has been described with reference to FIG. 2, and FIG. 3B illustrates an example in which the display position of the virtual image is changed to the upper left of the display unit 150 by the 3D rendering of the virtual image.

As illustrated in FIGS. 3A and 3B, the comparison between the virtual image 10*b* with the 2D correction applied and a virtual image 10*d* with the 3D rendering applied shows that the virtual image 10*d* with the 3D rendering applied has a larger change amount. Thus, in the case where the 3D rendering is applied, the change amount of the virtual image based on a slight change in the position and attitude of the HMD 100 becomes larger than that in the case where the 2D correction is applied, and the virtual image is thus more likely to flicker.

Thus, the HMD 100 according to the present disclosure can reduce flicker of the virtual image by controlling switching between a plurality of rendering frequencies in the rendering process of the virtual image. Note that the image frequencies can include at least a first rendering frequency and a second rendering frequency which is higher than the first rendering frequency. Here, it is only required that the first rendering frequency be a frequency that reduces rerendering of the virtual image, and the first frequency may be a value larger than zero. For example, the HMD 100 can reduce flicker of the virtual image by setting a threshold of the change amount for which only the 2D correction is performed without performing the 3D rendering (hereinbelow, referred to as "2D correction threshold") and controlling the threshold when the display position of the virtual image changes on the display unit 150. More specifically, when the change amount of the display position of the virtual image is smaller than the 2D correction threshold (when the virtual image has a first change amount), the HMD 100 performs only the 2D correction on the virtual image without performing the 3D rendering to correct the display position of the virtual image. In other words, when the change amount of the display position of the virtual image is smaller than the 2D correction threshold, the HMD 100 may control the rendering frequency to zero and prohibit the re-rendering. On the other hand, when the change amount of the display position of the virtual image is equal to or larger than the 2D correction threshold (when the virtual image has a second change amount), the HMD 100 performs not only the 2D correction, but also the 3D rendering to change the display position and angle of the virtual image. Note that, in this manner, the HMD 100 can reduce flicker of the virtual image by setting the 2D correction threshold compared to the case where the display of the virtual image is constantly controlled by the 3D rendering.

Here, a method for controlling the 2D correction threshold is not particularly limited to any method. For example, the HMD 100 may control the 2D correction threshold on the basis of the distance between the user and the virtual image to reduce flicker of the virtual image. Hereinbelow, the principle of the method for controlling the 2D correction threshold based on the distance between the user and the virtual image will be described with reference to FIGS. 4, 5A, 5B, 5C, 6, 7A, 7B, 7C, and 8.

First, a case where the distance between the user and the virtual image is small will be described with reference to FIGS. 4, 5A, 5B, and 5C. As illustrated in FIG. 4, in the case where the distance between a user 20 and a virtual image 10 is relatively small, and the user 20 is located at the front of the virtual image 10 (the position of a user 20a in FIG. 4), the virtual image 10 (indicated as a virtual image 10a in FIG. 5A) is displayed on the center of the display unit 150 as illustrated in FIG. 5A.

When the user moves to a right position (the position of a user 20b in FIG. 4) from the front of the virtual image 10, the display position of the virtual image 10 changes to the left on the display unit 150 as illustrated in FIG. 5B (indicated as a virtual image 10b in FIG. 5B). The parallax in the case where the distance between the user and the virtual image is small is larger than that in the case where the distance is large. Thus, the user is highly likely to feel something strange as illustrated in FIG. 5B unless the display angle of the virtual image 10 is also changed in addition to the display position thereof.

On the other hand, when the user moves to a left position (the position of a user 20c in FIG. 4) from the front of the virtual image 10, the display position of the virtual image 10 changes to the right on the display unit 150 as illustrated in FIG. 5C (indicated as a virtual image 10c in FIG. 5C). Also in this case, the user is highly likely to feel something strange as illustrated in FIG. 5C unless the display angle of the virtual image 10 is also changed in addition to the display position thereof.

Figure 6:
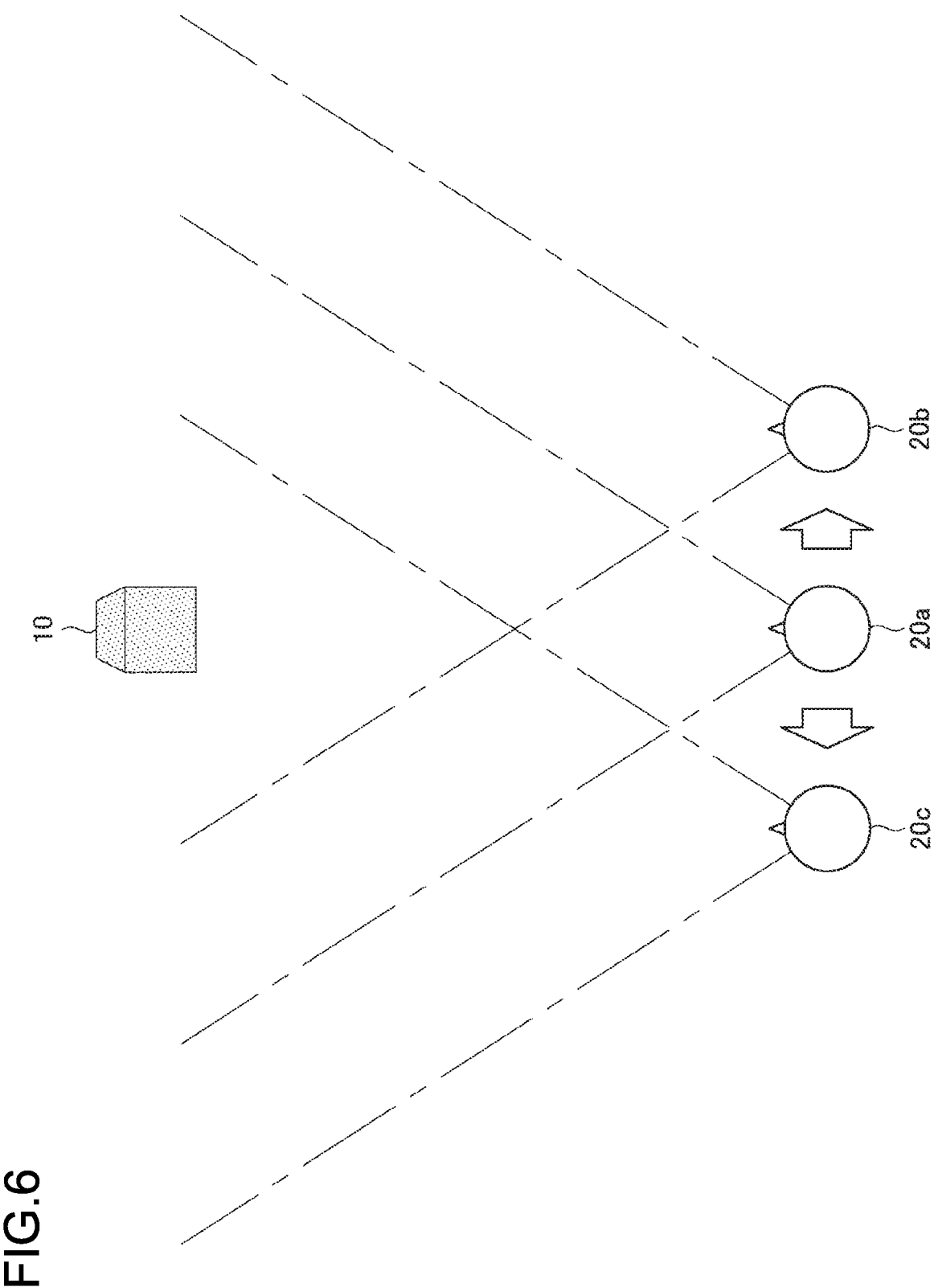
FIG. 6 is a diagram describing parallax in a case where the distance between a user and a virtual image is large.

Next, a case where the distance between the user and the virtual image is large will be described with reference to FIGS. 6, 7A, 7B, and 7C. As illustrated in FIG. 6, in the case where the distance between the user 20 and the virtual image 10 is relatively large, and the user 20 is located at the front of the virtual image 10 (the position of a user 20a in FIG. 6), the virtual image 10 (indicated as a virtual image 10a in FIG. 7A) is displayed on the center of the display unit 150 as illustrated in FIG. 7A.

When the user moves to a right position (the position of a user 20b in FIG. 6) from the front of the virtual image 10, the display position of the virtual image 10 changes to the left on the display unit 150 as illustrated in FIG. 7B (indicated as a virtual image 10b in FIG. 7B). The parallax in the case where the distance between the user and the virtual image is large is smaller than that in the case where the distance is small. Thus, as illustrated in FIG. 7B, the user is less likely to feel something strange even when only the display position of the virtual image 10 is changed without changing the display angle thereof.

On the other hand, when the user moves to a left position (the position of a user 20c in FIG. 6) from the front of the virtual image 10, the display position of the virtual image 10 changes to the right on the display unit 150 as illustrated in FIG. 7C (indicated as a virtual image 10c in FIG. 7C). Also in this case, as illustrated in FIG. 7C, the user is less likely to feel something strange even when only the display position of the virtual image 10 is changed without changing the display angle thereof.

Based on the above, the HMD 100 sets the 2D correction threshold to a smaller value in the case where the distance between the user and the virtual image is small than that in the case where the distance is large, and, on the other hand, sets the 2D correction threshold to a larger value in the case where the distance is large than that in the case where the distance is small. In other words, the HMD 100 may control the rendering frequency of the virtual image to the first rendering frequency in the case where the distance between the user and the virtual image is a first distance, and control the rendering frequency of the virtual image to the second rendering frequency in the case where the distance between the user and the virtual image is a second distance which is smaller than the first distance. Further, in a case where the distance between the user and the virtual image is extremely large (e.g., a case where the virtual image is located at infinity from the user), the parallax is extremely small. Thus, the HMD 100 may set the 2D correction threshold to an extremely large value to omit the 3D rendering. Note that the HMD 100 may reduce the rendering frequency of the virtual image in a continuous manner or in stages as the distance between the user and the virtual image becomes larger.

Next, the method for controlling the 2D correction threshold will be described in more detail with reference to FIGS. 8A and 8B. FIG. 8A illustrates a 2D correction threshold in a case where the distance between the user and the virtual image is relatively large, and FIG. 8B illustrates a 2D correction threshold in a case where the distance between the user and the virtual image is relatively small.

In FIG. 8A, when a virtual image 10d displayed on the center of the display unit 150 moves to the right, the HMD 100 performs only the 2D correction until the virtual image 10d moves beyond a boundary 30a, and performs not only the 2D correction, but also the 3D rendering when the virtual image 10d has moved beyond the boundary 30a. At this time, the 2D correction threshold is represented by a change amount 40a corresponding only to the 2D correction. Similarly, when the virtual image 10d moves to the left, the HMD 100 performs only the 2D correction until the virtual image 10d moves beyond a boundary 30b, and performs not only the 2D correction, but also the 3D rendering when the virtual image 10d has moved beyond the boundary 30b.

Then, in FIG. 8B, when a virtual image 10k displayed on the center of the display unit 150 moves to the right, the HMD 100 performs only the 2D correction until the virtual image 10k moves beyond a boundary 30c, and performs not only the 2D correction, but also the 3D rendering when the virtual image 10k has moved beyond the boundary 30c. At this time, the 2D correction threshold is represented by a change amount 40b corresponding only to the 2D correction. Similarly, when the virtual image 10k moves to the left, the HMD 100 performs only the 2D correction until the virtual image 10k moves beyond a boundary 30d, and performs not only the 2D correction, but also the 3D rendering when the virtual image 10k has moved beyond the boundary 30d.

As illustrated in FIGS. 8A and 8B, the HMD 100 sets the 2D correction threshold to a larger value in the case where the distance between the user and the virtual image is large than that in the case where the distance is small. This enables the HMD 100 to reduce flicker of the virtual image without making the user feel something strange by reducing the frequency of the 3D rendering and covering the reduction by the 2D correction.

Note that the method for controlling the 2D correction threshold illustrated in FIGS. 8A and 8B is merely an example, and can be appropriately modified. For example, the 2D correction threshold may be set to different values on the basis of the direction in which the display position of the virtual image changes. More specifically, the 2D correction threshold may be set to different values between a case where the display position of the virtual image changes in the horizontal direction and a case where the display position changes in the vertical direction. Further, the 2D correction threshold may be set to different values on the basis of the display position before changed. More specifically, the 2D correction threshold may be set to different values between a case where the virtual image is displayed on the center of the display unit 150 and a case where the virtual image is displayed on an end of the display unit 150.

Further, the 2D correction threshold may be controlled on the basis of an element other than the distance between the user and the virtual image.

For example, the HMD 100 may switch the rendering frequency of the virtual image on the basis of the accuracy of a sensing result relating to a real space. The sensing result relating to the real space includes the recognition accuracy of the position and attitude of the HMD 100 (display device), and the 2D correction threshold may be controlled on the basis of the recognition accuracy of the position and attitude of the HMD 100. For example, the HMD 100 may control the rendering frequency of the virtual image to the first rendering frequency when the recognition accuracy is a first recognition accuracy, and control the rendering frequency of the virtual image to the second rendering frequency when the recognition accuracy is a second recognition accuracy which is higher than the first recognition accuracy. More specifically, the HMD 100 may control the 2D correction threshold on the basis of a residual which is the difference between the prediction of the position and attitude of the HMD 100 and an actual result thereof. As described above, the HMD 100 predicts the position and attitude of the HMD 100 using the various sensors (the outward stereo camera, the acceleration sensor, and the gyro sensor) mounted on the HMD 100. When the residual in the prediction of the position and attitude of the HMD 100 is large, the operations of the various sensors are considered to be unstable. Thus, the flicker of the virtual image may become larger if the rendering of the virtual image is performed on the basis of the prediction of the position and attitude of the HMD 100. Thus, the HMD 100 may set the 2D correction threshold to a larger value as the residual in the prediction of the position and attitude of the HMD 100 becomes larger.

Further, as described above, the output error of the various sensors may increase as the temperature of the sensors themselves and the peripheral temperature become higher. Thus, the flicker of the virtual image is likely to increase. Thus, the HMD 100 may set the 2D correction threshold to a larger value as the temperature of the sensors themselves or the peripheral sensor become higher.

Further, the HMD 100 may control the 2D correction threshold on the basis of the resolution of the display unit 150 (e.g., a display). More specifically, as described above, when the resolution of the display unit 150 is low, the flicker of the virtual image is likely to increase. Thus, the HMD 100 may set the 2D correction threshold to a larger value as the resolution of the display unit 150 becomes lower.

Further, as described above, when the virtual image itself is standing still, the flicker of the virtual image is likely to become larger. Thus, the HMD 100 may set the 2D correction threshold to a larger value when the virtual image is standing still than that when the virtual image is not standing still.

Further, when the virtual image has a more complicated shape, pattern, or color, the flicker of the virtual image becomes larger. Thus, the HMD 100 may set the 2D correction threshold to a larger value when the virtual image has a more complicated shape, pattern, or color.

Further, as the virtual image displayed on the display unit 150 becomes larger, the user is more likely to recognize flicker of the virtual image. Thus, the HMD 100 may set the 2D correction threshold to a larger value when the virtual image displayed on the display unit 150 becomes larger.

Further, when the user is not gazing at the virtual image, the user is less likely to feel something strange even if the frequency of the 3D rendering is reduced, and the reduction is covered by the 2D correction. Thus, the HMD 100 may set the 2D correction threshold to an extremely large value when the user is not gazing at the virtual image. Further, the HMD 100 may set the 2D correction threshold to a larger value as the gaze point by the user becomes more distant from the virtual image.

The above methods are merely examples, and the method for controlling the 2D correction threshold is not limited to the above.

Further, the HMD 100 may control the rendering frequency of the virtual image not only by controlling the 2D correction threshold, but also by controlling the frame rate itself. Note that, in the present disclosure, the frame rate may be regarded as the frequency of display by the display device. In other words, the frequency of visual recognition by the user corresponds to the frame rate, and the frame rate may be regarded as one corresponding to the frequency of rendering the virtual image on the frame buffer. Typically, the frame rate and the rendering frequency can be substantially the same as each other.

More specifically, as described above, the parallax becomes smaller as the distance between the user and the virtual image becomes larger. Thus, even if the frequency of the 3D rendering is reduced, and the reduction is covered by the 2D correction, the user is less likely to feel something strange. Thus, the HMD 100 can further reduce the frame rate as the distance between the user and the virtual image becomes larger.

For example, the HMD 100 may calculate the frame rate using the following Formula 1 or may select one closest to a calculation result from a plurality of types of frame rates which are previously prepared.

$$y = cx^{-r} \qquad (1)$$

y: frame rate c: coefficient set for each user (a value reflecting eyesight of the user or the like)

x: distance between user and virtual image r: predetermined index

Note that the above Formula 1 is merely an example, and the method for calculating the frame rate is not limited thereto.

Further, the frame rate (rendering frequency) may be controlled on the basis of an element other than the distance between the user and the virtual image. For example, as with the 2D correction threshold, the frame rate may be controlled on the basis of the residual in the prediction of the position and attitude of the HMD 100, the temperature of the sensors, the resolution of the display unit 150, or the characteristic of the virtual image (the shape, pattern, color, or size of the virtual image) or the state of the virtual image (whether or not the virtual image is standing still). In other words, the HMD 100 may further reduce the frame rate when the flicker of the virtual image is more likely to occur. Note that the characteristic or state of the virtual image may be regarded as being determined on the basis of the sensing result relating to the real space. Further, the frame rate may be controlled on the basis of whether or not the user is gazing at the virtual image. In other words, the HMD 100 may further reduce the frame rate when the user is less likely to feel something strange even if the frequency of the 3D rendering is reduced, and the reduction is covered by the 2D correction.

Note that the HMD 100 may control the rendering frequency so as to be smaller than the frame rate of the displayed virtual image. More specifically, the control may be performed so that the rendering frequency is 30 [Hz], and the frame rate is 60 [Hz]. In this case, the same virtual image rendered on the frame buffer is displayed twice. Such a configuration is expected to prevent an increase in the processing load by the rendering frequency, reduce power consumption, or prevent an increase in the temperature while reducing flicker of the virtual image to be rendered.

3. First Embodiment

The outline of the present disclosure has been described above. Next, a first embodiment of the present disclosure will be described.

(3-1. Functional Configuration)

First, the functional configuration of an HMD 100 according to the first embodiment will be described with reference to FIG. 9.

Figure 9:
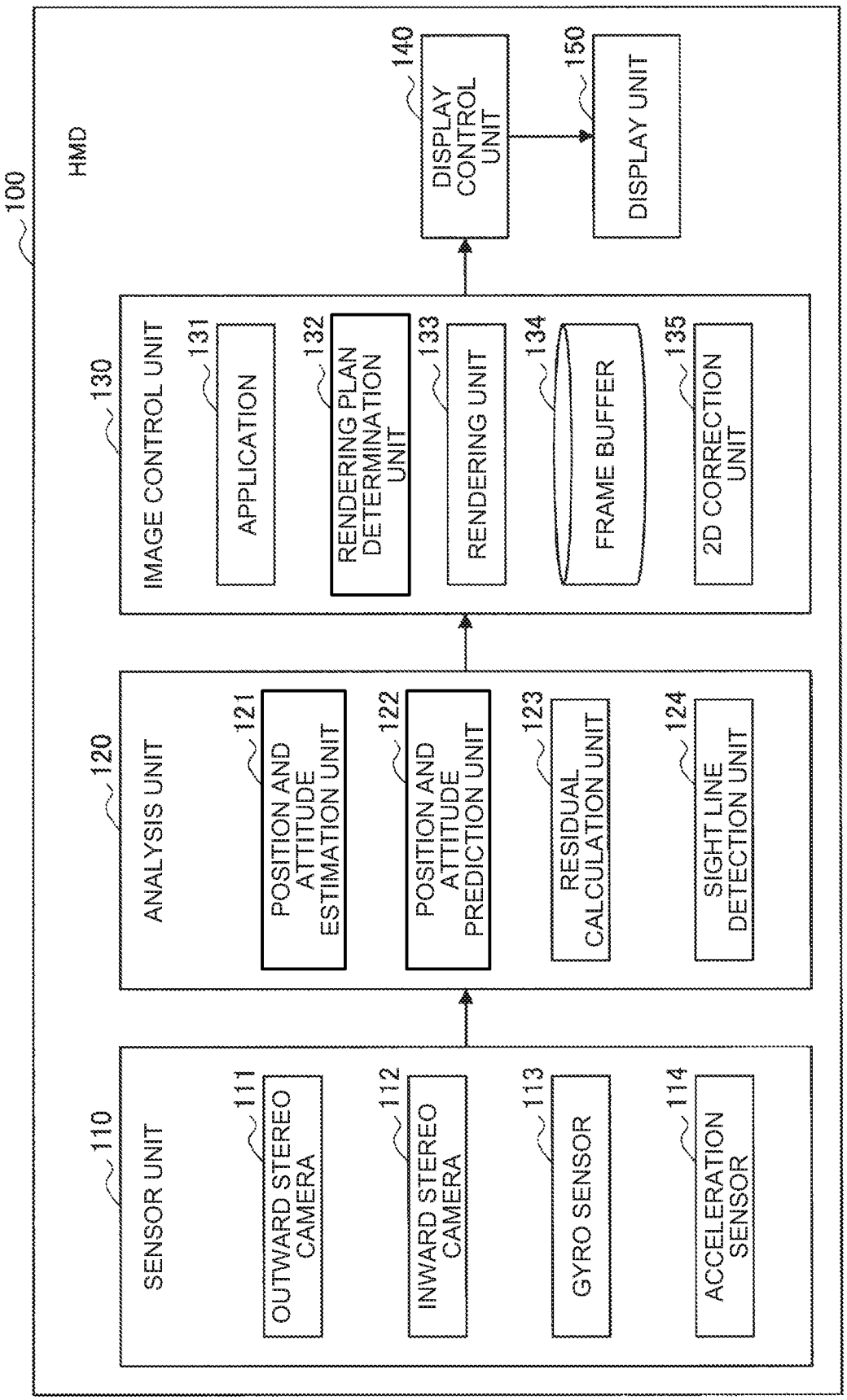
FIG. 9 is a block diagram illustrating a functional configuration of an HMD according to a first embodiment.

As illustrated in FIG. 9, the HMD 100 according to the first embodiment includes a sensor unit 110, an analysis unit 120, an image control unit 130, a display control unit 140, and a display unit 150.

(Sensor Unit 110)

The sensor unit 110 has a function of acquiring various pieces of information about a user or a peripheral environment, and providing the analysis unit 120 with the acquired information. For example, the sensor unit 110 includes an outward stereo camera 111, an inward stereo camera 112, a gyro sensor 113, and an acceleration sensor 114. Note that these sensors are merely examples, and the sensors included in the sensor unit 110 are not limited to these sensors. For example, the sensor unit 110 may additionally include a temperature sensor. Further, each of the sensors includes a plurality of sensors.

Each of the outward stereo camera 111 and the inward stereo camera 112 has a function as a stereo camera, and includes a lens system which includes an imaging lens, a diaphragm, a zoom lens, and a focus lens, a drive system which causes the lens system to perform a focusing operation and a zoom operation, and a solid-state image sensor array which photoelectrically converts imaging light obtained by the lens system to generate an imaging signal. Examples of the solid-state image sensor array may include a charge coupled device (CCD) sensor array and a complementary metal oxide semiconductor (CMOS) sensor array.

The gyro sensor 113 includes, for example, a three-axis gyro sensor, and detects the angular velocity (rotation speed).

The acceleration sensor 114 includes, for example, a three-axis acceleration sensor 114 (also referred to as a G sensor), and detects the acceleration during moving.

(Analysis Unit 120)

The analysis unit 120 has a function of analyzing various pieces of information provided by the sensor unit 110 and providing the image control unit 130 with a result of the analysis. For example, the analysis unit 120 includes a position and attitude estimation unit 121, a position and attitude prediction unit 122, a residual calculation unit 123, and a sight line detection unit 124. Note that these units are merely examples, and the functional configurations included in the analysis unit 120 are not limited to these units.

The position and attitude estimation unit 121 estimates the position and attitude of the HMD 100. More specifically, the position and attitude estimation unit 121 generates a depth map on the basis of sensing data of the outward stereo camera 111 provided by the sensor unit 110 to implement visual simultaneous localization and mapping (SLAM), and calculates the position and attitude, speed, and inertial acceleration of the HMD 100 by the visual SLAM. Further, the position and attitude estimation unit 121 performs various processes relating to inertial navigation which uses the acceleration and the angular velocity obtained from the gyro sensor 113 and the acceleration sensor 114 (or an inertial measurement unit (IMU) including these sensors) with the calculated position and attitude and speed as original values to estimate the newest position and attitude, speed, and angular velocity of the HMD 100 with high accuracy. Note that the above estimation method is merely an example, and can be appropriately changed. The position and attitude estimation unit 121 provides the position and attitude prediction unit 122 with the estimation result of the position and attitude of the HMD 100.

The position and attitude prediction unit 122 predicts the position and attitude of the HMD 100 at a certain time point in the future. For example, the position and attitude prediction unit 122 predicts the position and attitude of the HMD 100 at a certain time point in the future using a method such as linear interpolation on the basis of the estimation result of the position and attitude of the HMD 100 in the past provided by the position and attitude estimation unit 121. Note that this prediction method is merely an example, and can be appropriately modified.

The residual calculation unit 123 has a function of calculating the residual which is the difference between the prediction of the position and attitude of the HMD 100 and an actual result thereof. More specifically, the residual calculation unit 123 compares the position and attitude at a certain time point predicted by the position and attitude prediction unit 122 with the actual position and attitude at the certain time point estimated by the position and attitude estimation unit 121 to calculate the residual.

The sight line detection unit 124 has a function of detecting the line of sight of the user wearing the HMD 100.

More specifically, the sight line detection unit 124 analyzes a captured image of the eyes of the user generated by the inward stereo camera 112 to recognize the sight line direction of the user. An algorithm of the sight line detection is not particularly limited to any algorithm. For example, the sight line direction of the user can be recognized on the basis of the positional relationship between the inner corner of the eye and the iris or the positional relationship between the corneal reflex and the pupil.

(Image Control Unit 130)

The image control unit 130 has a function as a rendering control unit which controls the rendering of the virtual image using the analysis result provided by the analysis unit 120. The image control unit 130 includes an application 131, a rendering plan determination unit 132, a rendering unit 133, a frame buffer 134, and a 2D correction unit 135. Note that these units are merely examples, and the functional configurations included in the image control unit 130 are not limited to these units. For example, the 2D correction unit may be replaced with a correction unit that performs not only two-dimensional correction, but also three-dimensional deformation or positional correction.

The application 131 is an application program relating to a service used by the user using the HMD 100. The application 131 determines the content, position, size, and angle of the virtual image on the basis of the prediction result of the position and attitude of the HMD 100 at a certain time point in the future provided by the position and attitude prediction unit 122. The application 131 provides the rendering plan determination unit 132 and the rendering unit 133 with the determined content.

The rendering plan determination unit 132 has a function of determining a rendering plan such as the rendering frequency of the virtual image. For example, the rendering plan determination unit 132 may calculate the distance between the user and the virtual image on the basis of the prediction result of the position and attitude of the HMD 100 at a certain time point in the future provided by the position and attitude prediction unit 122, and the position of the virtual image at the certain time point provided by the application 131, and determine the rendering plan such as the 2D correction threshold and the frame rate on the basis of the calculated distance. Further, as described above, the rendering plan may be determined on the basis of not only the distance between the user and the virtual image, but also the residual in the prediction of the position and attitude of the HMD 100, the temperature of the sensors, the resolution of the display unit 150, the characteristic of the virtual image (the shape, pattern, color, or size of the virtual image) or the state of the virtual image (whether or not the virtual image is standing still), or whether or not the user is gazing at the virtual image. The rendering plan determination unit 132 provides the rendering unit 133 with the determined rendering plan.

The rendering unit 133 performs the 3D rendering of the virtual image using the analysis result provided by the analysis unit 120, the rendering plan provided by the rendering plan determination unit 132, and the content of the virtual image provided by the application 131. More specifically, the rendering unit 133 does not perform the 3D rendering of the virtual image when the change amount of the display position of the virtual image is smaller than the 2D correction threshold, and performs the 3D rendering of the virtual image at the determined frame rate when the change amount of the display position of the virtual image is equal to or larger than the 2D correction threshold. The rendered virtual image is provided to the frame buffer 134.

The frame buffer 134 is a storage area in which the virtual image generated by the rendering unit 133 is temporarily stored. The frame buffer 134 may store a virtual image for one screen, or virtual images for a plurality of screens.

The 2D correction unit 135 has a function of performing the 2D correction. More specifically, the 2D correction unit 135 calculates the display position of the virtual image on the basis of the prediction result of the position and attitude of the HMD 100 at the display time point of the virtual image provided by the position and attitude prediction unit 122, and performs 2D correction on the virtual image rendered by the rendering unit 133 to correct the display position of the virtual image.

(Display Control Unit 140)

The display control unit 140 has a function of displaying the virtual image corrected by the 2D correction unit 135 by controlling the display unit 150.

(Display Unit 150)

The display unit 150 is a functional configuration that displays the virtual image. For example, the display unit 150 may be, but not limited to, a display. Examples of the display unit 150 include, a lens unit which performs display using a hologram optical technology, a liquid crystal display (LCD) device, and an organic light emitting diode (OLED) device.

(3-2. Operation)

The functional configuration of the HMD 100 according to the first embodiment has been described above. Next, the operation of the HMD 100 according to the first embodiment will be described with reference to FIG. 10.

First, the rendering plan determination unit 132 reads a parameter in Step S1000, and temporarily determines the 2D correction threshold and the frame rate on the basis of the parameter in Step S1004. The parameter read in by the rendering plan determination unit 132 may be customized for each user wearing the HMD 100. For example, the parameter may be customized for each user on the basis of the eyesight of the user.

In Step S1008, the position and attitude of the HMD 100 is updated. More specifically, the position and attitude estimation unit 121 estimates the position and attitude of the HMD 100, and the position and attitude prediction unit 122 predicts the position and attitude of the HMD 100. When the residual which is the difference between the prediction of the position and attitude of the HMD 100 and the actual result thereof has exceeded a predetermined threshold in Step S1012 (Step S1012/Yes), the rendering plan determination unit 132 determines that flicker of the virtual image is likely to occur, and changes the 2D correction threshold to a larger value in Step S1016. Note that when the residual does not exceed the predetermined threshold (Step S1012/No), the 2D correction threshold is not changed.

When the distance between the user and the virtual image calculated by the rendering plan determination unit 132 has exceeded a predetermined threshold in Step S1020 (Step S1020/Yes), the rendering plan determination unit 132 determines that the frequency of the 3D rendering can be reduced, and the reduction can be covered by the 2D correction, and reduces the frame rate in Step S1024. Note that when the distance does not exceed the predetermined threshold (Step S1020/No), the frame rate is not changed.

When it is the turn to render the virtual image on the basis of the frame rate in Step S1028 (Step S1028/Yes), and the user is looking at the virtual image (Step S1032/Yes), the rendering unit 133 renders the virtual image in Step S1036. Then, in Step S1040, the 2D correction unit 135 performs the 2D correction on the virtual image on the basis of the prediction result of the newest position and attitude.

When it is not the turn to render the virtual image on the basis of the frame rate in Step S1028 (Step S1028/No), the rendering of the virtual image is not performed, and the 2D correction unit 135 performs the 2D correction on the virtual image in Step S1040. Further, when the user is not looking at the virtual image in Step S1032 (Step S1032/No), the user is less likely to feel something strange even if the rendering of the virtual image is not performed. Thus, the 2D correction unit 135 performs the 2D correction on the virtual image in Step S1040 without performing the rendering of the virtual image.

Figure 10:
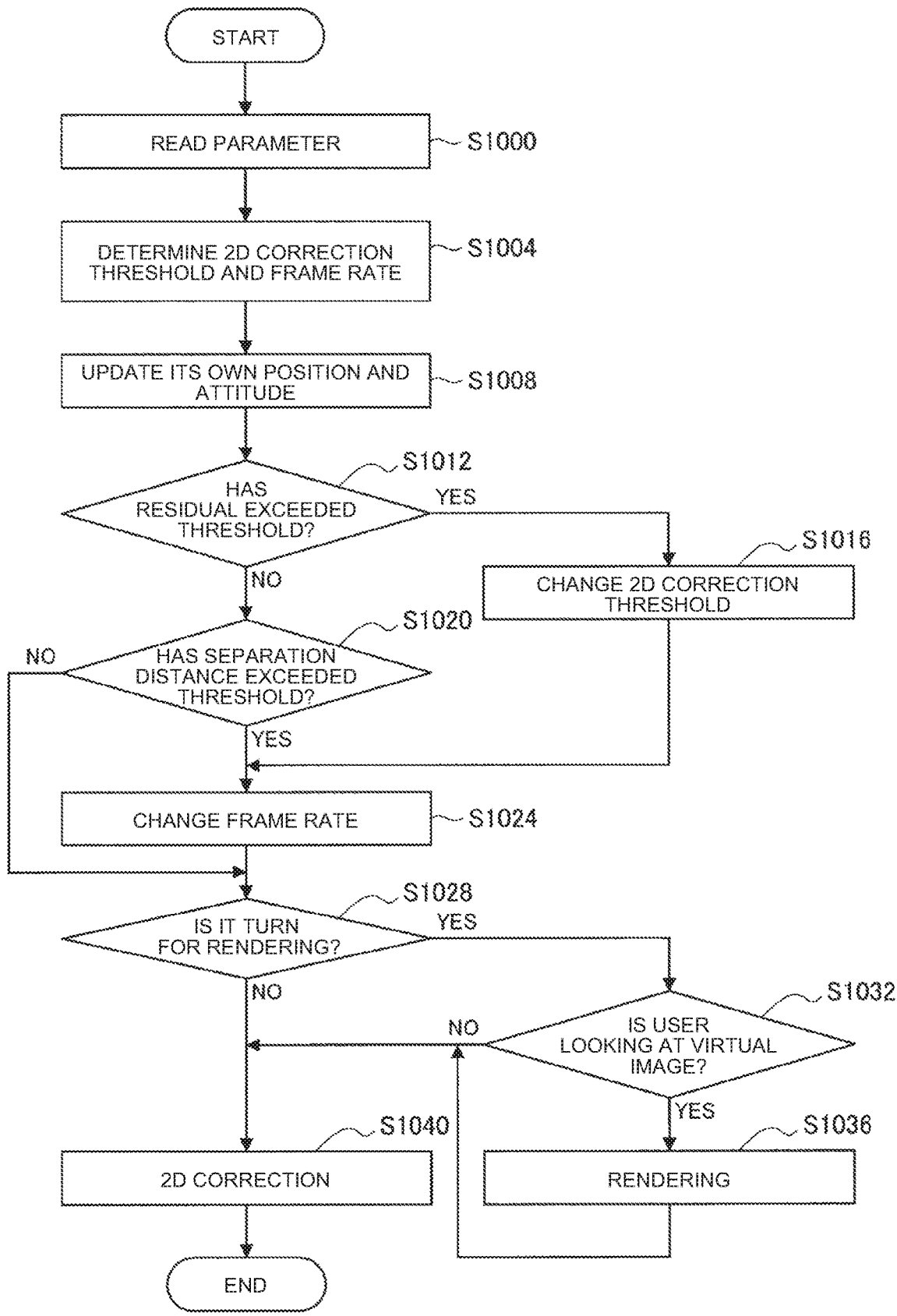
FIG. 10 is a flowchart illustrating the operation of the HMD according to the first embodiment.

Note that the flowchart of FIG. 10 is merely an example, and can be appropriately modified. For example, Steps S1000 and S1004 may be omitted after executed at the time of starting the display of the virtual image. More specifically, after each process illustrated in the flowchart of FIG. 10 is performed once, the processes of Steps S1000 and S1004 may be omitted, and the processes of Step S1008 and thereafter may be repeatedly performed. Further, when the user is not looking at the virtual image in Step S1032 (Step S1032/No), and there is no real object or virtual image to be compared around the virtual image, the user is less likely to feel something strange. Thus, not only the 3D rendering, but also the 2D correction may be omitted.

Further, the 2D correction threshold may be determined on the basis of not the residual, but the distance between the user and the virtual image, the temperature of the sensors, the resolution of the display unit 150, the characteristic of the virtual image (the shape, pattern, color, or size of the virtual image) or the state of the virtual image (whether or not the virtual image is standing still), or whether or not the user is gazing at the virtual image as described above. Furthermore, the frame rate may be determined on the basis of not the distance between the user and the virtual image, but the residual in the prediction of the position and attitude of the HMD 100, the temperature of the sensors, the resolution of the display unit 150, the characteristic of the virtual image (the shape, pattern, color, or size of the virtual image) or the state of the virtual image (whether or not the virtual image is standing still), or whether or not the user is gazing at the virtual image as described above.

3-3. Application Example

The operation of the HMD 100 according to the first embodiment of the present disclosure has been described above. Next, an application example of the first embodiment of the present disclosure will be described with reference to FIGS. 11 and 12.

Figure 11:
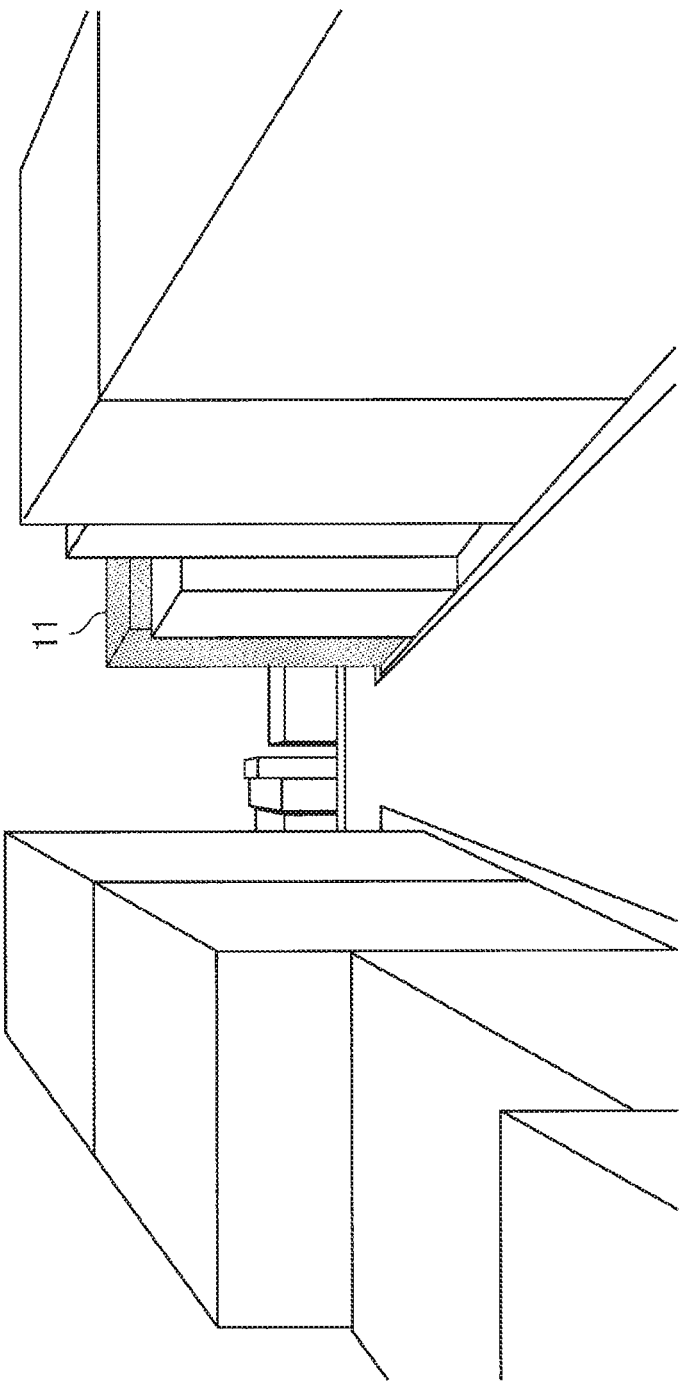
FIG. 11 is a diagram illustrating an application example of the first embodiment.

FIG. 11 is an example of a case where a building which is scheduled to be constructed is displayed as a virtual image 11 in a townscape in a real space.

Even in the case of a huge object such a building, when the distance between the user and the virtual image 11 of the building is relatively large as illustrated in FIG. 11, the parallax becomes smaller. Thus, the HMD 100 can reduce flicker of the virtual image 11 without making the user feel something strange by changing the 2D correction threshold to a larger value and reducing the frame rate to reduce the frequency of the 3D rendering and covering the reduction by the 2D correction. This enables the HMD 100 to make the virtual image 11 less likely to flicker even if the building has a complicated shape.

Figure 12:
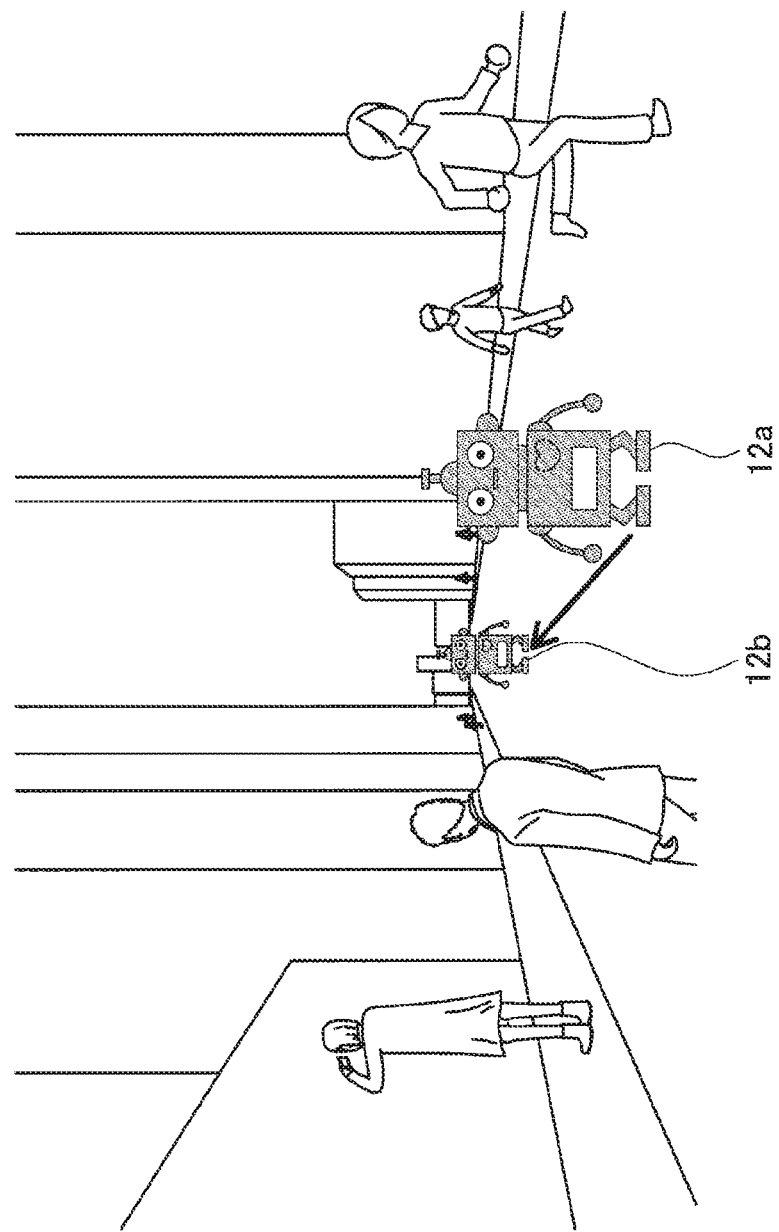
FIG. 12 is a diagram illustrating an application example of the first embodiment.

FIG. 12 is an example of a case where a robot displayed as a virtual image 12 guides a user wearing the HMD 100 to a destination.

When the robot guides the user while maintaining the distance of a predetermined value or larger from the user (e.g., the virtual image 12 moves from the position of a virtual image 12a to the position of a virtual image 12b with a forward movement of the user), small parallax can be maintained. Thus, as with the application example of FIG. 11, the HMD 100 can reduce flicker of the virtual image 12 without making the user feel something strange by changing the 2D correction threshold to a larger value and reducing the frame rate to reduce the frequency of the 3D rendering and covering the reduction by the 2D correction.

FIGS. 11 and 12 are merely examples. Thus, the first embodiment of the present disclosure may be applied to other serves or systems.

4. Second Embodiment

The first embodiment of the present disclosure has been described above. Next, a second embodiment of the present disclosure will be described.

The second embodiment is an example of a case where a virtual image is superimposed on a detected plane. More specifically, in a case where a planar virtual image, such as a poster or a painting, is superimposed on a detected plane, a user is less likely to feel something strange even if the frequency of 3D rendering is reduced, and the reduction is covered by 2D correction compared to a case where a three-dimensional virtual image is displayed. Thus, in the case where the virtual image is superimposed on the detected plane, an HMD 100 can reduce flicker of the virtual image without making the user feel something strange by setting a 2D correction threshold to a larger value or reducing the frame rate.

(4-1. Functional Configuration)

First, the functional configuration of the HMD 100 according to the second embodiment will be described with reference to FIG. 13. Note that, in the following description, only the difference from the functional configuration of the HMD 100 according to the first embodiment (refer to FIG. 9) will be mentioned.

Figure 13:
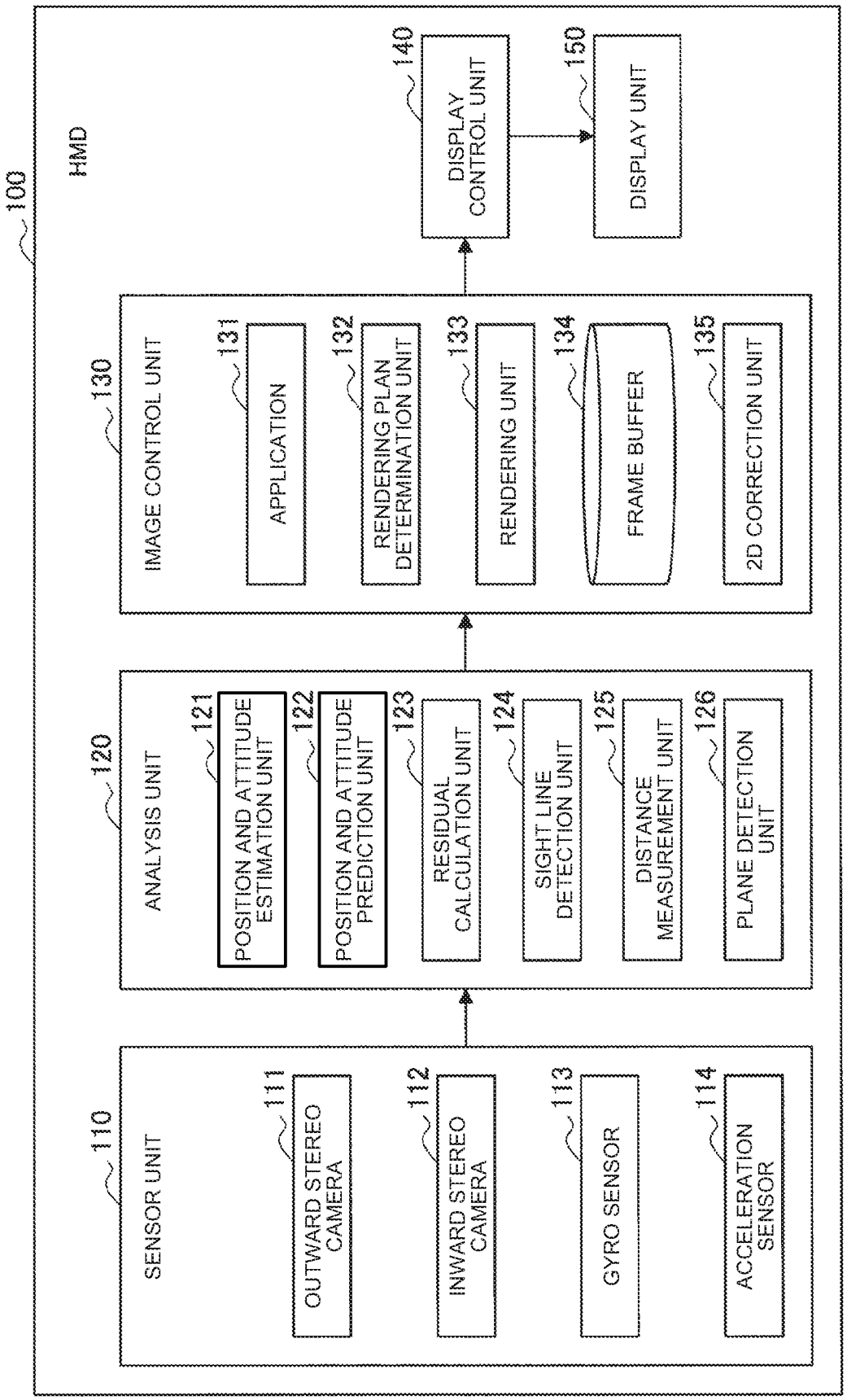
FIG. 13 is a block diagram illustrating a functional configuration of an HMD according to a second embodiment.

As illustrated in FIG. 13, an analysis unit 120 of the HMD 100 according to the second embodiment includes a distance measurement unit 125 and a plane detection unit 126.

The plane detection unit 126 has a function of detecting a plane in a captured image by performing, for example, projective transformation using the captured image generated by the outward stereo camera 111. The distance measurement unit 125 calculates the distance to a point on the plane in the captured image used in the projective transformation. Note that the method of the plane detection is not limited to a particular method, and may be any method.

Note that the functional configuration of the HMD 100 according to the second embodiment is merely an example, and can be appropriately modified. Further, the functional configuration of the HMD 100 according to the first embodiment and the functional configuration of the HMD 100 according to the second embodiment may be combined.

(4-2. Operation)

The functional configuration of the HMD 100 according to the second embodiment has been described above. Next, the operation of the HMD 100 according to the second embodiment will be described with reference to FIG. 14.

Steps S1100 to S1108 are the same as Steps S1000 to S1008 in FIG. 10. Thus, description thereof will be omitted. In Step S1112, the plane detection unit 126 detects a plane in a captured image. Note that when there is a plane that has already been detected, the plane may be used to omit the plane detection process. In Step S1116, the rendering plan determination unit 132 changes a residual threshold used in Step S1120 and a distance threshold used in Step S1128 on the basis of whether or not a real object or a virtual image to be compared is present around the virtual image. For example, when there is no real object or virtual image to be compared around the virtual image, the user is less likely to recognize a delay of the virtual image. Thus, the rendering plan determination unit 132 can set the 2D correction threshold to a larger value and reduce the frame rate by changing the residual threshold and the distance threshold. Steps S1120 to S1148 are the same as steps S1012 to S1040 of FIG. 10. Thus, description thereof will be omitted.

Figure 14:
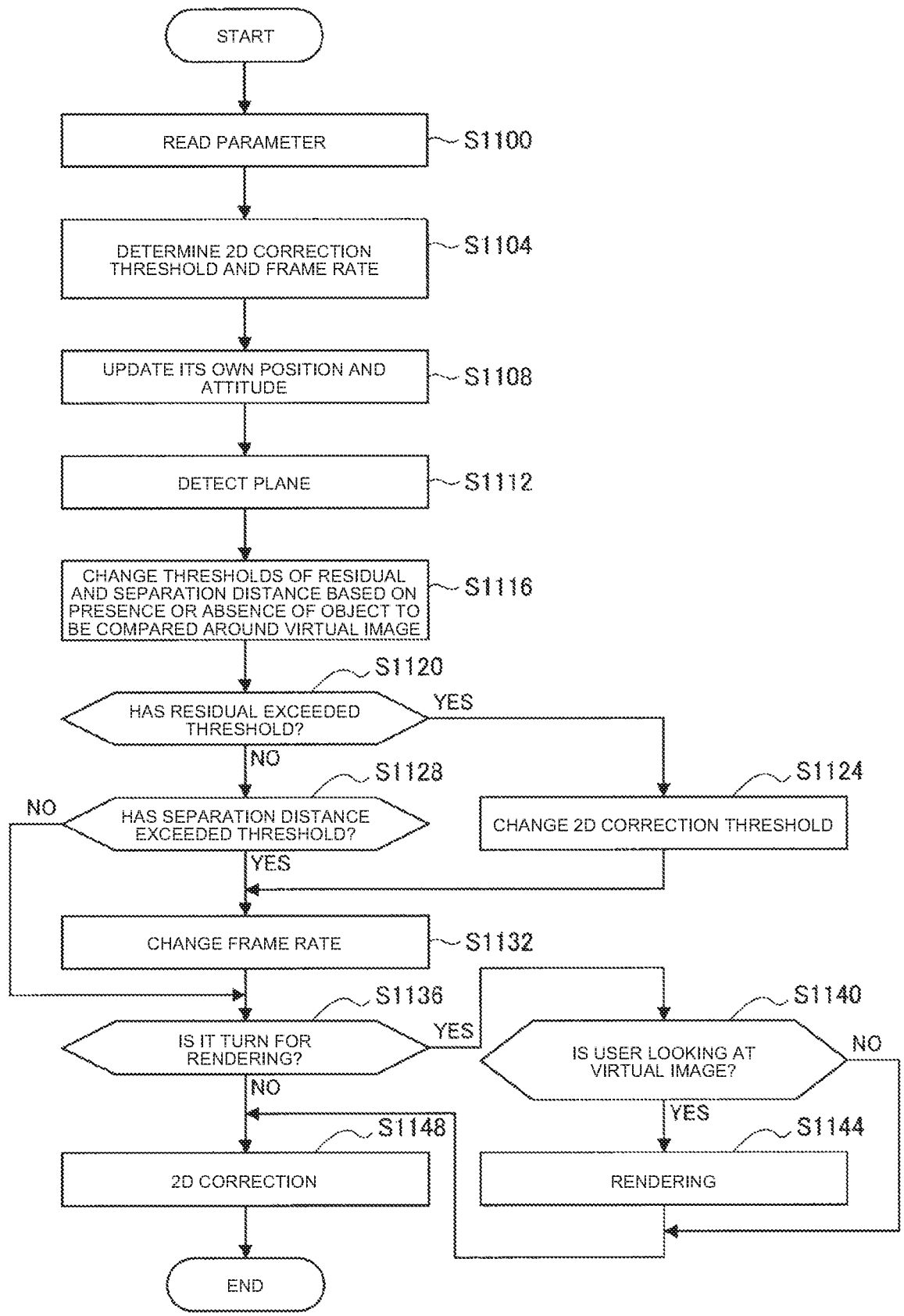
FIG. 14 is a flowchart illustrating the operation of the HMD according to the second embodiment.

Note that the flowchart of FIG. 14 is merely an example, and can be appropriately modified. For example, as with FIG. 10, Steps S1100 and S1104 may be omitted after executed at the time of starting the display of the virtual image. More specifically, after each process illustrated in the flowchart of FIG. 14 is performed once, the processes of Steps S1100 and S1104 may be omitted, and the processes of Step S1108 and thereafter may be repeatedly performed.

Further, the 2D correction threshold may be determined on the basis of not the residual, but the distance between the user and the virtual image, the temperature of the sensors, the resolution of the display unit 150, the characteristic of the virtual image (the shape, pattern, color, or size of the virtual image) or the state of the virtual image (whether or not the virtual image is standing still), whether or not the user is gazing at the virtual image as described above. Furthermore, the frame rate may be determined on the basis of not the distance between the user and the virtual image, but the residual in the prediction of the position and attitude of the HMD 100, the temperature of the sensors, the resolution of the display unit 150, the characteristic of the virtual image (the shape, pattern, color, or size of the virtual image) or the state of the virtual image (whether or not the virtual image is standing still), or whether or not the user is gazing at the virtual image as described above.

4-3. Application Example

The operation of the HMD 100 according to the second embodiment of the present disclosure has been described above. Next, an application example of the second embodiment of the present disclosure will be described with reference to FIG. 15.

Figure 15:
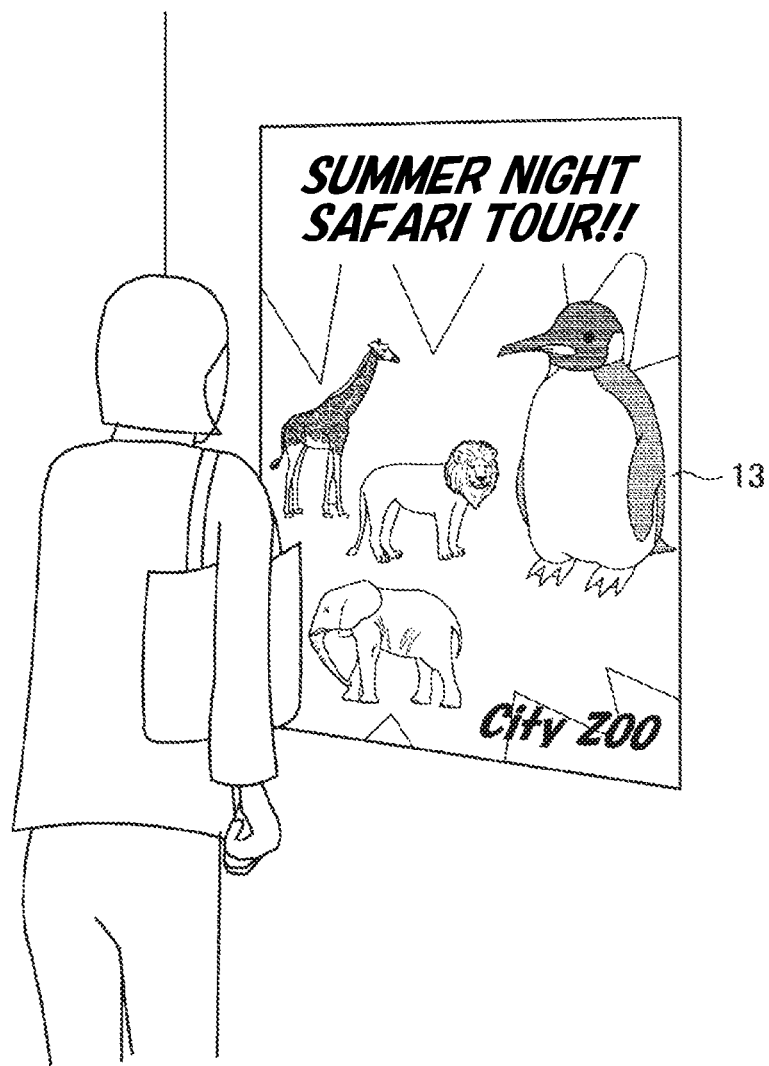
FIG. 15 is a diagram illustrating an application example of the second embodiment.

FIG. 15 is an example of a case where a virtual image 13 of a poster is superimposed on a wall surface which is a plane detected in a captured image.

The virtual image 13 of the poster including characters, or colorful pictures or images is likely to flicker. Further, as described above, in the case where the planar virtual image 13, such as a poster, is superimposed on a plane, the user is less likely to feel something strange even if the frequency of 3D rendering is reduced, and the reduction is covered by the 2D correction compared to the case where a three-dimensional virtual image is displayed. Thus, the HMD 100 can reduce flicker of the virtual image 13 without making the user feel something strange by setting the 2D correction threshold to a larger value or reducing the frame rate.

5. Hardware Configuration

The embodiments of the present disclosure have been described above. The process for controlling the rendering frequency by controlling the 2D correction threshold or the frame rate is implemented by cooperation with hardware described below.

Figure 16:
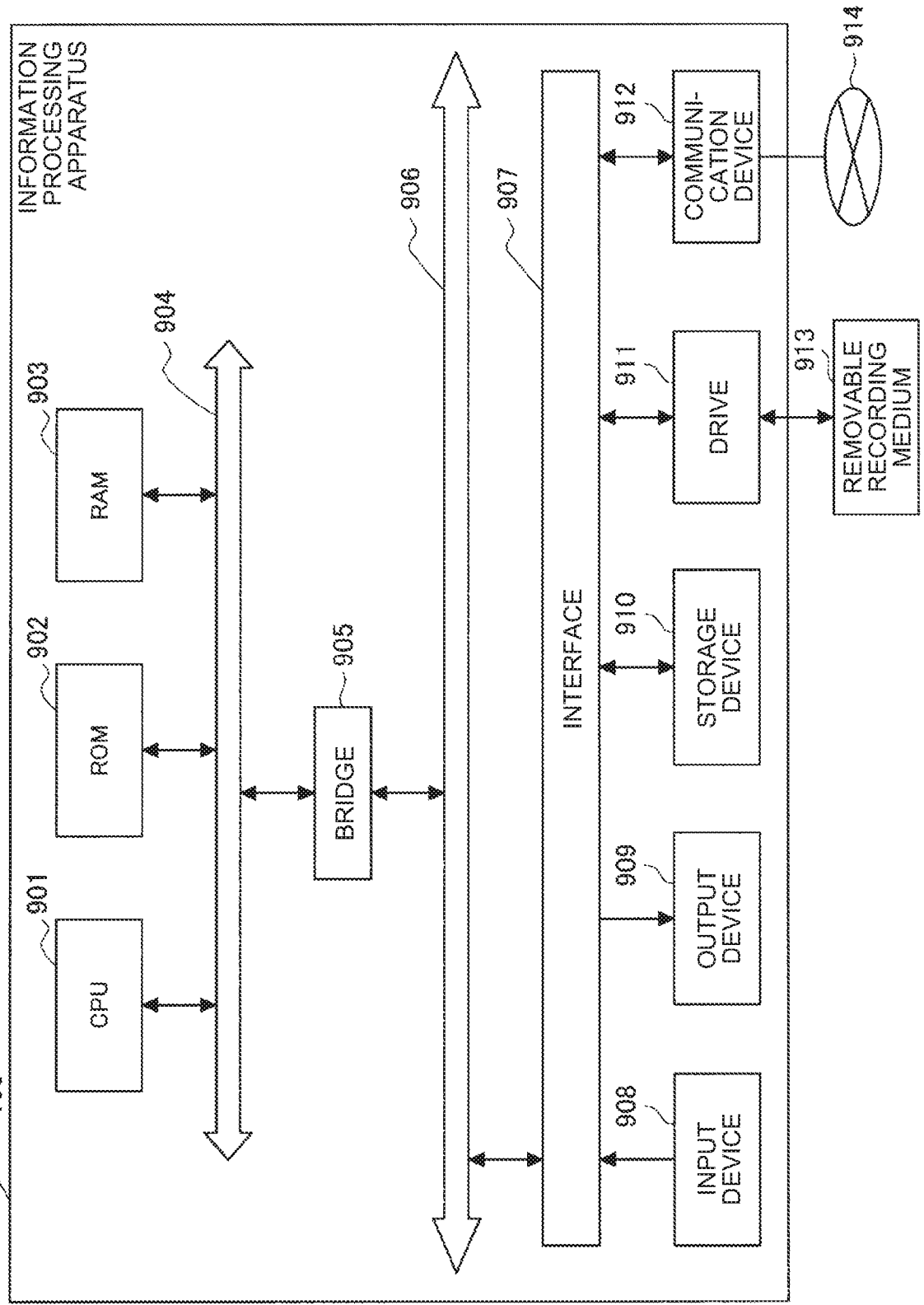
FIG. 16 is a block diagram illustrating a hardware configuration of the HMD.

FIG. 16 is a diagram illustrating the hardware configuration of an information processing apparatus 900, which embodies the HMD 100 according to the present disclosure. The information processing apparatus 900 includes a central processing unit (CPU) 901, a read only memory (ROM) 902, a random access memory (RAM) 903, a host bus 904, a bridge 905, an external bus 906, an interface 907, an input device 908, an output device 909, a storage device (HDD) 910, a drive 911, and a communication device 912.

The CPU 901 functions as an arithmetic processor and a controller, and controls the entire operation inside the information processing apparatus 900 in accordance with various programs. Further, the CPU 901 may be a microprocessor. The ROM 902 stores programs and operation parameters used by the CPU 901. The RAM 903 temporarily stores programs used in execution of the CPU 901 and parameters which appropriately vary in the execution. The CPU 901, the ROM 902, and the RAM 903 are connected to each other through the host bus 904, which includes a CPU bus. The cooperation of the CPU 901, the ROM 902, and the RAM 903 implements each function of the sensor unit 110, the analysis unit 120, the image control unit 130, or the display control unit 140.

The host bus 904 is connected to the external bus 906 such as a peripheral component interconnect/interface (PCI) bus via the bridge 905. Note that the host bus 904, the bridge 905, and the external bus 906 are not necessarily separated from each other, and these functions may be implemented by a single bus.

The input device 908 includes input means for inputting information by a user, such as a mouse, a keyboard, a touch panel, a button, a microphone, a switch, or a lever, and an input control circuit which generates an input signal on the basis of the input by the user and outputs the input signal to the CPU 901. The user who uses the information processing apparatus 900 can input various pieces of data and make an instruction of a processing operation to each device by operating the input device 908.

The output device 909 includes, for example, a display device such as a cathode ray tube (CRT) display device, a liquid crystal display (LCD) device, an organic light emitting diode (OLED) device, or a lamp. Further, the output device 909 includes a voice output device such as a speaker or a headphone. The output device 909, for example, outputs a reproduced content. Specifically, the display device displays various pieces of information such as reproduced video data as a text or an image. On the other hand, the voice output device converts reproduced voice data to voice and outputs the voice. The output device 909 implements the function of the display unit 150.

The storage device 910 is a device for data storage which is configured as an example of a storage unit (not illustrated) of the information processing apparatus 900. The storage device 910 may include a storage medium, a recording device which records data in the storage medium, a reading device which reads data from the storage medium, and a deletion device which deletes data recorded in the storage medium. The storage device 910 includes, for example, a hard disk drive (HDD). The storage device 910 drives a hard disk to store programs executed by the CPU 901 and various pieces of data.

The drive 911 is a storage medium reader/writer, and incorporated in or externally attached to the information processing apparatus 900. The drive 911 reads information recorded in a removable recording medium 913 attached to the drive 911, such as a magnetic disk, an optical disk, a magneto-optical disk, or a semiconductor memory, and outputs the read information to the RAM 903. Further, the drive 911 is also capable of writing information into the removable recording medium 913.

The communication device 912 is, for example, a communication interface which includes a communication device for connection to a communication network 914.

6. Conclusion

As described above, the HMD 100 according to the present disclosure controls the rendering frequency of the virtual image to appropriately control the 2D correction and the 3D rendering, thereby reducing flicker of the virtual image. For example, when the display position of the virtual image changes on the display unit 150, the HMD 100 controls the 2D correction threshold or the frame rate on the basis of the distance between the user and the virtual image, the residual in the prediction of the position and attitude of the HMD 100, the temperature of the sensors, the resolution of the display unit 150, the characteristic of the virtual image (the shape, pattern, color, or size of the virtual image) or the state of the virtual image (whether or not the virtual image is standing still), or whether or not the user is gazing at the virtual image. This enables the HMD 100 to reduce flicker of the virtual image without making the user feel something strange by reducing the frequency of the 3D rendering and covering the reduction by the 2D correction.

The preferred embodiments of the present disclosure have been described in detail above with reference to the accompanying drawings. However, the technical scope of the present disclosure is not limited to the above examples. It is obvious that those skilled in the art of the present disclosure can conceive various modifications or corrections within the range of the technical idea described in claims, and it should be understood that these modifications and corrections also belong to the technical scope of the present disclosure as a matter of course.

For example, when the distance between the user and the virtual image is large or when the recognition accuracy of the position and attitude of the HMD 100 is low, the HMD 100 may omit not only the 3D rendering, but also the 2D correction. Further, when there is no real object or virtual image to be compared around the virtual image, the user is less likely to feel something strange. Thus, the HMD 100 may omit not only the 3D rendering, but also the 2D correction. This enables the HMD 100 to further reduce flicker of the virtual image.

Further, the steps in each of the flowcharts described above are not necessarily performed in a time-series manner following the order described as the flowchart. In other words, the steps may be performed in order different from the order described as the flowchart or performed in parallel with each other.

Further, the functional configuration of the HMD 100 may be appropriately modified. For example, part of the functional configuration of the HMD 100 may be appropriately included in an external device. Further, the functional configurations such as the sight line detection unit 124, the distance measurement unit 125, and the plane detection unit 126 may be appropriately omitted.

Further, the effects described in the present specification are not limited effects, but solely explanatory or illustrative effects. In other words, the technology according to the present disclosure can achieve other effects that are obvious to those skilled in the art from the description of the specification, in addition to or instead of the above effects.

Note that the configurations as described below also belong to the technical scope of the present disclosure.

(1)

An information processing apparatus comprising:
a rendering control unit configured to switch a rendering frequency of a virtual image between a first rendering frequency and a second rendering frequency higher than the first rendering frequency on the basis of a sensing result relating to a real space; and
a display control unit configured to cause a display device to display the virtual image on the basis of the sensing result and either the first rendering frequency or the second rendering frequency.

(2)

The information processing apparatus according to (1), wherein
the rendering control unit controls the rendering frequency of the virtual image to the first rendering frequency when the virtual image based on the sensing result has a first change amount, and
the rendering control unit controls the rendering frequency of the virtual image to the second rendering frequency when the virtual image has a second change amount larger than the first change amount.

(3)

The information processing apparatus according to (2), wherein
re-rendering of the virtual image is prohibited at the first rendering frequency.

(4)

The information processing apparatus according to (2) or (3), further comprising
a correction unit configured to correct a display position of the virtual image, wherein
the correction unit corrects the display position of the virtual image while the rendering control unit reduces re-rendering of the virtual image when the virtual image has the first change amount.

(5)

The information processing apparatus according to (4), wherein
the correction unit two-dimensionally corrects the display position of the virtual image rendered by the rendering control unit on the basis of position and attitude relating to the display device.

(6)

The information processing apparatus according to any one of (2) to (5), wherein
the virtual image is re-rendered at the second rendering frequency.

(7)

The information processing apparatus according to any one of (2) to (6), wherein
the first change amount is a change amount smaller than a predetermined threshold,
the second change amount is a change amount larger than the predetermined threshold, and
the rendering control unit changes the predetermined threshold to switch the rendering frequency of the virtual image between the first rendering frequency and the second rendering frequency.

(8)

The information processing apparatus according to any one of (1) to (7), wherein the rendering control unit controls a frame rate to switch the rendering frequency of the virtual image between the first rendering frequency and the second rendering frequency.

(9)

The information processing apparatus according to any one of (1) to (8), wherein the rendering control unit switches the rendering frequency of the virtual image between the first rendering frequency and the second rendering frequency on the basis of a positional relationship between a user of the display device, the user visually recognizing the virtual image, and the virtual image.

(10)

The information processing apparatus according to (9), wherein the rendering control unit switches the rendering frequency of the virtual image between the first rendering frequency and the second rendering frequency on the basis of a distance between the user and the virtual image.

(11)

The information processing apparatus according to (10), wherein the rendering control unit controls the rendering frequency of the virtual image to the first rendering frequency when the distance between the user and the virtual image is a first distance, and controls the rendering frequency of the virtual image to the second rendering frequency when the distance between the user and the virtual image is a second distance smaller than the first distance.

(12)

The information processing apparatus according to (11), wherein the rendering control unit reduces the rendering frequency of the virtual image as the distance between the user and the virtual image becomes larger.

(13)

The information processing apparatus according to any one of (1) to (12), wherein the rendering control unit switches the rendering frequency of the virtual image between the first rendering frequency and the second rendering frequency on the basis of an accuracy of the sensing result relating to the real space.

(14)

The information processing apparatus according to (13), wherein the accuracy of the sensing result relating to the real space includes a recognition accuracy of position and attitude relating to the display device, and the rendering control unit switches the rendering frequency of the virtual image between the first rendering frequency and the second rendering frequency on the basis of the recognition accuracy.

(15)

The information processing apparatus according to (14), wherein the rendering control unit controls the rendering frequency of the virtual image to the first rendering frequency when the recognition accuracy is a first recognition accuracy, and controls the rendering frequency of the virtual image to the second rendering frequency when the recognition accuracy is a second recognition accuracy higher than the first recognition accuracy.

(16)

The information processing apparatus according to any one of (1) to (15), wherein a characteristic or a state of the virtual image is determined on the basis of the sensing result relating to the real space, and the rendering control unit switches the rendering frequency of the virtual image between the first rendering frequency and the second rendering frequency on the basis of the characteristic or the state of the virtual image.

(17)

The information processing apparatus according to (16), wherein the rendering control unit switches the rendering frequency of the virtual image between the first rendering frequency and the second rendering frequency on the basis of at least one of complexity of a shape, pattern, or color, a size, or a state of an operation of the virtual image.

(18)

The information processing apparatus according to any one of (1) to (17), wherein the rendering control unit switches the rendering frequency of the virtual image between the first rendering frequency and the second rendering frequency on the basis of a resolution of the display device.

(19)

The information processing apparatus according to any one of (1) to (18), wherein the rendering control unit switches the rendering frequency of the virtual image between the first rendering frequency and the second rendering frequency on the basis of a positional relationship between a line of sight of a user of the display device and the virtual image.

(20)

The information processing apparatus according to any one of (1) to (19), wherein the rendering control unit makes the first rendering frequency lower than a frame rate of the virtual image displayed by the display device.

(21)

An information processing method executed by at least one processor, the method comprising:

switching a rendering frequency of a virtual image between a first rendering frequency and a second rendering frequency higher than the first rendering frequency on the basis of a sensing result relating to a real space; and causing a display device to display the virtual image on the basis of the sensing result and either the first rendering frequency or the second rendering frequency.

(22)

A program for causing a computer to execute:

switching a rendering frequency of a virtual image between a first rendering frequency and a second rendering frequency higher than the first rendering frequency on the basis of a sensing result relating to a real space; and causing a display device to display the virtual image on the basis of the sensing result and either the first rendering frequency or the second rendering frequency.

REFERENCE SIGNS LIST

100 HMD
110 SENSOR UNIT

111 OUTWARD STEREO CAMERA
112 INWARD STEREO CAMERA
113 GYRO SENSOR
114 ACCELERATION SENSOR
120 ANALYSIS UNIT
121 POSITION AND ATTITUDE ESTIMATION UNIT
122 POSITION AND ATTITUDE PREDICTION UNIT
123 RESIDUAL CALCULATION UNIT
124 SIGHT LINE DETECTION UNIT
125 DISTANCE MEASUREMENT UNIT
126 PLANE DETECTION UNIT
130 IMAGE CONTROL UNIT
131 APPLICATION
132 RENDERING PLAN DETERMINATION UNIT
133 RENDERING UNIT
134 FRAME BUFFER
135 2D CORRECTION UNIT
140 DISPLAY CONTROL UNIT
150 DISPLAY UNIT

The invention claimed is:

1. An information processing apparatus, comprising:
a central processing unit (CPU) configured to:
receive, from a sensor, a sensing result related to a real space;
switch a rendering frequency of a virtual image between a first rendering frequency and a second rendering frequency based on an accuracy of the sensing result, wherein
the accuracy of the sensing result includes a recognition accuracy of position and attitude related to a display device that displays the virtual image, and
the second rendering frequency is greater than the first rendering frequency;
set the rendering frequency of the virtual image to the first rendering frequency in a case where the recognition accuracy is a first recognition accuracy;
set the rendering frequency of the virtual image to the second rendering frequency in a case where the recognition accuracy is a second recognition accuracy, wherein the second recognition accuracy is higher than the first recognition accuracy; and
control the display device to display the virtual image based on the sensing result and one of the first rendering frequency or the second rendering frequency.

2. The information processing apparatus according to claim 1, wherein the CPU is further configured to:
control the rendering frequency of the virtual image to the first rendering frequency based on a first change amount of the virtual image; and
control the rendering frequency of the virtual image to the second rendering frequency based on a second change amount of the virtual image, and
the second change amount is larger than the first change amount.

3. The information processing apparatus according to claim 2, wherein the CPU is further configured to prohibit re-rendering of the virtual image at the first rendering frequency.

4. The information processing apparatus according to claim 2, wherein the CPU is further configured to:
reduce re-rendering of the virtual image based on the first change amount of the virtual image; and
correct a display position of the virtual image while the re-rendering of the virtual image is reduced.

5. The information processing apparatus according to claim 4, wherein the CPU is further configured to:
render the virtual image based on the position and the attitude related to the display device; and
correct the display position of the rendered virtual image in two-dimensions.

6. The information processing apparatus according to claim 2, wherein the CPU is further configured to re-render the virtual image at the second rendering frequency.

7. The information processing apparatus according to claim 2, wherein
the first change amount is smaller than a determined threshold,
the second change amount is larger than the determined threshold, and
the CPU is further configured to change the determined threshold to switch the rendering frequency of the virtual image between the first rendering frequency and the second rendering frequency.

8. The information processing apparatus according to claim 1, wherein the CPU is further configured to control a frame rate of the virtual image to switch the rendering frequency of the virtual image between the first rendering frequency and the second rendering frequency.

9. The information processing apparatus according to claim 1, wherein
the CPU is further configured to switch the rendering frequency of the virtual image between the first rendering frequency and the second rendering frequency based on a positional relationship between a user of the display device and the virtual image.

10. The information processing apparatus according to claim 9, wherein the CPU is further configured to switch the rendering frequency of the virtual image between the first rendering frequency and the second rendering frequency based on a distance between the user and the virtual image.

11. The information processing apparatus according to claim 10, wherein the CPU is further configured to:
control the rendering frequency of the virtual image to the first rendering frequency in a case where the distance between the user and the virtual image is a first distance; and
control the rendering frequency of the virtual image to the second rendering frequency in a case where the distance between the user and the virtual image is a second distance, and
the second distance is smaller than the first distance.

12. The information processing apparatus according to claim 11, wherein the CPU is further configured to reduce the rendering frequency of the virtual image as the distance between the user and the virtual image becomes larger.

13. The information processing apparatus according to claim 1, wherein the CPU is further configured to:
determine one of a characteristic of the virtual image or a state of the virtual image based on the sensing result; and
switch the rendering frequency of the virtual image between the first rendering frequency and the second rendering frequency based on one of the characteristic of the virtual image or the state of the virtual image.

14. The information processing apparatus according to claim 13, wherein the CPU is further configured to switch the rendering frequency of the virtual image between the first rendering frequency and the second rendering frequency based on at least one of complexity of a shape of the virtual image, a pattern of the virtual image, color of the virtual image, a size of the virtual image, or a state of an operation of the virtual image.

15. The information processing apparatus according to claim 1, wherein the CPU is further configured to switch the rendering frequency of the virtual image between the first rendering frequency and the second rendering frequency based on a resolution of the display device.

16. The information processing apparatus according to claim 1, wherein the CPU is further configured to switch the rendering frequency of the virtual image between the first rendering frequency and the second rendering frequency based on a positional relationship between a line of sight of a user of the display device and the virtual image.

17. The information processing apparatus according to claim 1, wherein the CPU is further configured to reduce the first rendering frequency below a frame rate of the virtual image displayed by the display device.

18. An information processing method, comprising:
receiving, from a sensor, a sensing result related to a real space;
switching, by a processor, a rendering frequency of a virtual image between a first rendering frequency and a second rendering frequency based on an accuracy of the sensing result, wherein
the accuracy of the sensing result includes a recognition accuracy of position and attitude related to a display device that displays the virtual image, and
the second rendering frequency is greater than the first rendering frequency;
setting, by the processor, the rendering frequency of the virtual image to the first rendering frequency in a case where the recognition accuracy is a first recognition accuracy;
setting, by the processor, the rendering frequency of the virtual image to the second rendering frequency in a case where the recognition accuracy is a second recognition accuracy, wherein the second recognition accuracy is higher than the first recognition accuracy; and
controlling, by the processor, the display device to display the virtual image based on the sensing result and one of the first rendering frequency or the second rendering frequency.

19. A non-transitory computer-readable medium having stored thereon computer-executable instructions which, when executed by a computer, cause the computer to execute operations, the operations comprising:
receiving, from a sensor, a sensing result related to a real space;
switching a rendering frequency of a virtual image between a first rendering frequency and a second rendering frequency based on an accuracy of the sensing result, wherein
the accuracy of the sensing result includes a recognition accuracy of position and attitude related to a display device that displays the virtual image, and
the second rendering frequency is greater than the first rendering frequency;
setting the rendering frequency of the virtual image to the first rendering frequency in a case where the recognition accuracy is a first recognition accuracy;
setting the rendering frequency of the virtual image to the second rendering frequency in a case where the recognition accuracy is a second recognition accuracy, wherein the second recognition accuracy is higher than the first recognition accuracy; and
controlling the display device to display the virtual image based on the sensing result and one of the first rendering frequency or the second rendering frequency.

* * * * *